(12) United States Patent
Takeyasu et al.

(10) Patent No.: US 12,393,189 B2
(45) Date of Patent: Aug. 19, 2025

(54) COMMUNICATION MANAGEMENT DEVICE, COMMUNICATION MANAGEMENT METHOD, DRIVING SUPPORT DEVICE, DRIVING SUPPORT METHOD AND COMPUTER READABLE MEDIUM

(71) Applicant: MITSUBISHI ELECTRIC CORPORATION, Tokyo (JP)

(72) Inventors: Masaaki Takeyasu, Tokyo (JP); Mari Ochiai, Tokyo (JP); Shusaku Umeda, Tokyo (JP); Takeshi Suehiro, Tokyo (JP); Takashi Asahara, Tokyo (JP); Teruko Fujii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 196 days.

(21) Appl. No.: 18/203,308

(22) Filed: May 30, 2023

(65) Prior Publication Data

US 2023/0305559 A1   Sep. 28, 2023

Related U.S. Application Data

(63) Continuation of application No. PCT/JP2021/004424, filed on Feb. 5, 2021.

(51) Int. Cl.
*G05D 1/00* (2024.01)
*H04W 4/44* (2018.01)
(Continued)

(52) U.S. Cl.
CPC ......... *G05D 1/0022* (2013.01); *G05D 1/0061* (2013.01); *H04W 4/44* (2018.02);
(Continued)

(58) Field of Classification Search
CPC ......... G05D 1/00; G05D 1/0022; H04W 4/44; H04W 24/04; H04W 64/003; H04W 68/00; G08G 1/09; G08G 1/0968
(Continued)

(56) References Cited

U.S. PATENT DOCUMENTS 6,625,135 B1   9/2003   Johnson et al.
6,771,609 B1   8/2004   Gudat et al.
(Continued)

FOREIGN PATENT DOCUMENTS

CN   110876147 A   *   3/2020   ............. H04L 65/80
CN   116233796 A   *   6/2023   ............. H04W 24/04
(Continued)

OTHER PUBLICATIONS

German Office Action dated Nov. 16, 2023 for Application No. 11 2021 006 291.3 with an English translation.
(Continued)

*Primary Examiner* — Atul Trivedi
(74) *Attorney, Agent, or Firm* — BIRCH, STEWART, KOLASCH & BIRCH, LLP

(57) ABSTRACT

A communication management device (10) estimates communication quality between a control device (30) mounted on a moving object (70) and a driving assistance device (20) to provide a driving assistance service for the control device (30), at a scheduled time when the moving object (70) passes through a communication area, which includes a scheduled path where the moving object (70) passes. The communication management device (10) notifies the driving assistance device (20) when the communication quality is outside a range of quality being a standard. When it is notified, the driving assistance device (20) changes the driving assistance service to be provided for the control device (30).

14 Claims, 15 Drawing Sheets

(51) Int. Cl.
*H04W 24/04* (2009.01)
*H04W 64/00* (2009.01)
*H04W 68/00* (2009.01)

(52) U.S. Cl.
CPC ......... *H04W 24/04* (2013.01); *H04W 64/003* (2013.01); *H04W 68/00* (2013.01)

(58) Field of Classification Search
USPC .............................................................. 701/2
See application file for complete search history.

(56) References Cited

U.S. PATENT DOCUMENTS

| | | | |
|---|---|---|---|
| 2018/0281809 A1* | 10/2018 | Tochioka | B60W 40/09 |
| 2018/0281810 A1* | 10/2018 | Tochioka | B60W 40/09 |
| 2019/0228654 A1* | 7/2019 | Olsen | G08G 1/096716 |
| 2019/0285427 A1 | 9/2019 | Tamura et al. | |
| 2020/0219386 A1 | 7/2020 | El Assaad | |
| 2020/0275243 A1* | 8/2020 | Ueno | H04W 40/22 |
| 2020/0282980 A1* | 9/2020 | Kinoshita | G05D 1/0027 |
| 2020/0309553 A1 | 10/2020 | Onodera et al. | |
| 2020/0412813 A1* | 12/2020 | Mong | B61L 15/0036 |
| 2021/0019854 A1* | 1/2021 | Lagnemma | G06Q 50/40 |
| 2021/0331709 A1* | 10/2021 | Kim | A61B 5/1172 |
| 2022/0228874 A1 | 7/2022 | Nader et al. | |
| 2024/0282122 A1* | 8/2024 | Aquilina | G08G 1/09623 |

FOREIGN PATENT DOCUMENTS

| | | | | |
|---|---|---|---|---|
| CN | 117376870 A | * | 1/2024 | |
| EP | 3335496 B1 | * | 2/2021 | ............. G08G 1/161 |
| EP | 3731547 B1 | * | 8/2024 | ............. H04L 5/005 |
| JP | 5-199167 A | | 8/1993 | |
| JP | 7-66764 A | | 3/1995 | |
| JP | 2001-251358 A | | 9/2001 | |
| JP | 2004-268829 A | | 9/2004 | |
| JP | 2005-208032 A | | 8/2005 | |
| JP | 2005-285108 A | | 10/2005 | |
| JP | 4864543 B2 | | 2/2012 | |
| JP | 2019-160242 A | | 9/2019 | |
| JP | 2020-113272 A | | 7/2020 | |
| JP | 2020-165832 A | | 10/2020 | |
| JP | 2020205037 A | * | 12/2020 | ........... G05D 1/0027 |
| WO | WO 2020/207932 A1 | | 10/2020 | |
| WO | WO-2020227435 A1 | * | 11/2020 | ........... H04L 47/127 |
| WO | WO-2020230371 A1 | * | 11/2020 | ........... B64C 39/024 |
| WO | WO-2020235009 A1 | * | 11/2020 | .............. B61L 25/02 |
| WO | WO-2021018260 A1 | * | 2/2021 | ............. H04W 4/06 |
| WO | WO-2021090668 A1 | * | 5/2021 | ............. B60Q 1/507 |

OTHER PUBLICATIONS

International Search Report (PCT/ISA/210) issued in PCT/JP2021/004424 mailed on Apr. 27, 2021.
Japanese Notification of Reason for Refusal dated Nov. 2, 2021 in Japanese Patent Application No. 2021-534273.

* cited by examiner

Fig. 8

| TYPE | REQUIRED COMMUNICATION QUALITY | | |
|---|---|---|---|
| | HIGH-QUALITY | STANDARD-QUALITY | LOW-QUALITY |
| REMOTE OPERATION SERVICE OF REMOTE-TYPE AUTOMATIC DRIVING | 1 | 2 | 3 |
| REMOTE MONITORING SERVICE OF REMOTE-TYPE AUTOMATIC DRIVING | 4 | 5 | 6 |
| DYNAMIC MAP GENERATION SERVICE OF AUTONOMOUS AUTOMATIC DRIVING | ... | ... | ... |
| SURROUNDING ENVIRONMENT INFORMATION PROVISION SERVICE | ... | ... | ... |

Fig. 9

| COMMUNICATION QUALITY | DELAY TIME [MILLISECOND] | DATA RATE (UL) [Mbps: MEGA BIT PER SECOND] | DATA RATE (DL) [Mbps: MEGA BIT PER SECOND] |
|---|---|---|---|
| 1 | 5 | 25 | 1 |
| 2 | 10 | 25 | 0.5 |
| 3 | 20 | 15 | 0.5 |
| 4 | 30 | 25 | 5 |
| 5 | 50 | 15 | 2 |
| 6 | 100 | 15 | 1 |
| 7 | ⋮ | ⋮ | ⋮ |
| 8 | ⋮ | ⋮ | ⋮ |

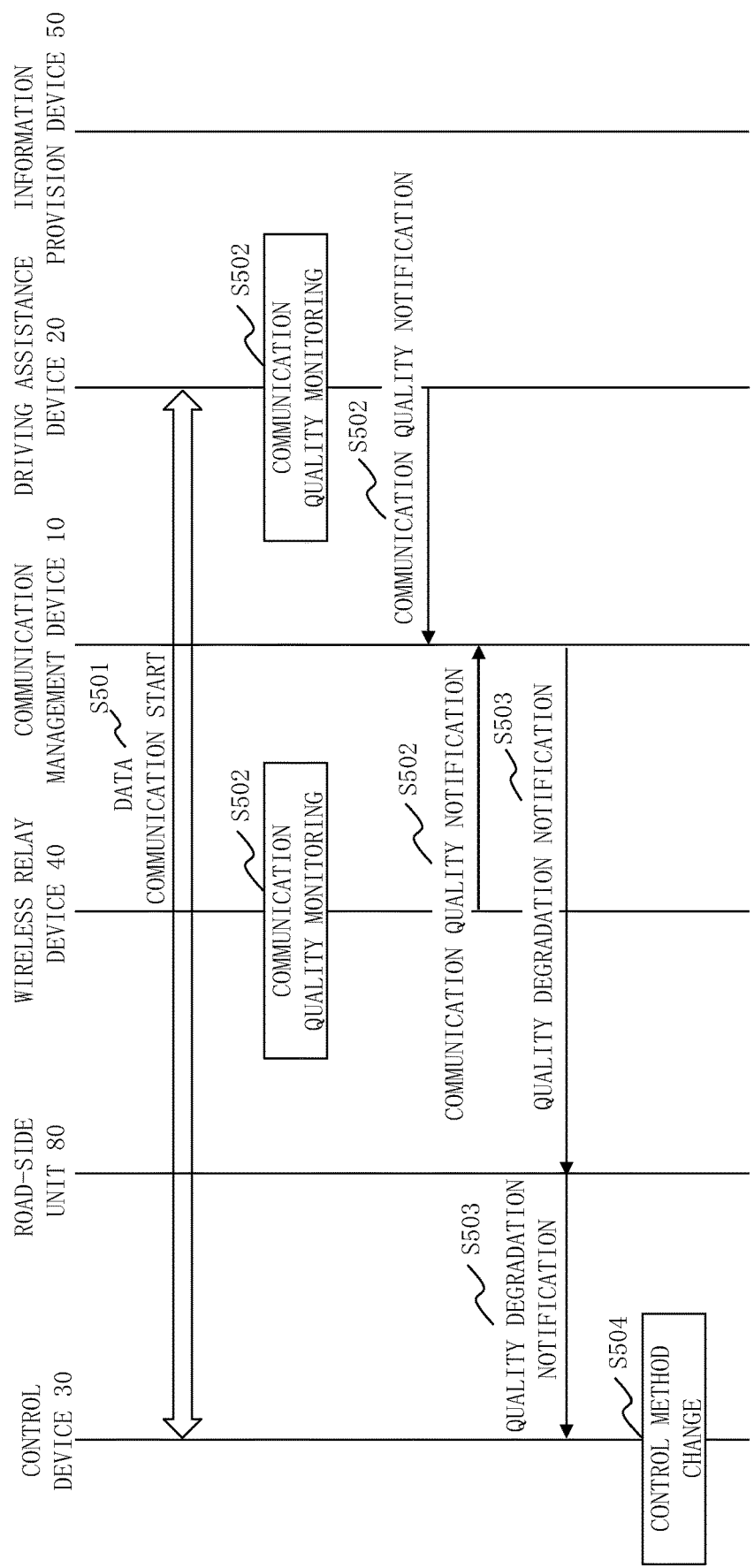

COMMUNICATION MANAGEMENT DEVICE, COMMUNICATION MANAGEMENT METHOD, DRIVING SUPPORT DEVICE, DRIVING SUPPORT METHOD AND COMPUTER READABLE MEDIUM

CROSS REFERENCE TO RELATED APPLICATION

This application is a Continuation of PCT International Application No. PCT/JP2021/004424, filed on Feb. 5, 2021, which is hereby expressly incorporated by reference into the present application.

TECHNICAL FIELD

The present invention relates to a driving support technique of a moving object.

BACKGROUND ART

These days, development of automatic driving technologies has been accelerated. By spreading automatic driving cars using the automatic driving technologies, efforts to realize reduction of traffic accidents, easing of traffic congestion, improvement in logistical efficiency, movement assistance of aged people, etc. have been advanced.

As a method to utilize automatic driving cars, it has been considered an unmanned automatic driving service in a limited area. The unmanned automatic driving service is a remote-type automatic driving system by remote monitoring or remote operation, and the use of the unmanned automatic driving service in small-sized mobility, a bus, a taxi, etc. is considered.

In a remote-type automatic driving system, monitoring of a travelling state of a vehicle and a driving instruction by remote operation, etc. are performed via a communication network by a driving assistance device disposed remotely. Therefore, when communication quality adjusted beforehand is not kept due to traffic situation, etc. around a vehicle, etc., stability of vehicle control is lowered, and safety and comfortability may be affected.

Therefore, there is a necessity to improve techniques in the remote-type automatic driving system such as management of communication quality and path generation in accordance with the communication quality, etc.

Patent Literature 1 discloses acquisition of communication quality in a plurality of geographical locations, and setting of a path routed through an area with high communication quality. In Patent Literature 1, by setting a path so as not to pass an area with low communication quality, a path of a moving object that meets the requirements of communication quality is set.

CITATION LIST

Patent Literature

Patent Literature 1: JP2020-165832 A

SUMMARY OF INVENTION

Technical Problem

The communication quality changes in accordance with circumstances. Therefore, there may be a case wherein necessary communication quality is not obtained. Patent Literature 1 does not take into account occurrence of a situation wherein necessary communication quality cannot be obtained. Therefore, there is a possibility that necessary communication quality cannot be obtained, and safety of and comfortableness on a moving object are degraded.

The present invention is aimed at making it possible to realize suitable control in accordance with communication quality in a remote-type driving assistance system.

Solution to Problem

There is provided according to one aspect of the present invention A communication management device includes:
a quality estimation unit to estimate a communication quality between a control device that is mounted on a moving object and a driving assistance device to provide a driving assistance service for the control device, at a scheduled time when the moving object passes through a communication area, which includes a scheduled path where the moving object passes, and
a notification unit to notify the driving assistance device when the communication quality estimated by the quality estimation unit is outside a range of a standard quality.

Advantageous Effects of Invention

In the present invention, when communication quality between a control device and a driving assistance device with respect to a communication area at a scheduled time when a moving object passes through the communication area becomes outside a range of quality, a notification is made. In this manner, it is possible for the driving assistance device to perform control such as to change a type of a driving assistance service. As a result, it is possible to realize appropriate control in accordance with communication quality.

BRIEF DESCRIPTION OF DRAWINGS

FIG. 8 is an explanatory diagram of quality information 231 according to the first embodiment;

FIG. 9 is an explanatory diagram of communication quality according to the first embodiment;

FIG. 15 is a processing flowchart of an operation of the driving assistance system 100 according to the second embodiment.

DESCRIPTION OF EMBODIMENTS

First Embodiment

*Description of Configuration*

Figure 1:
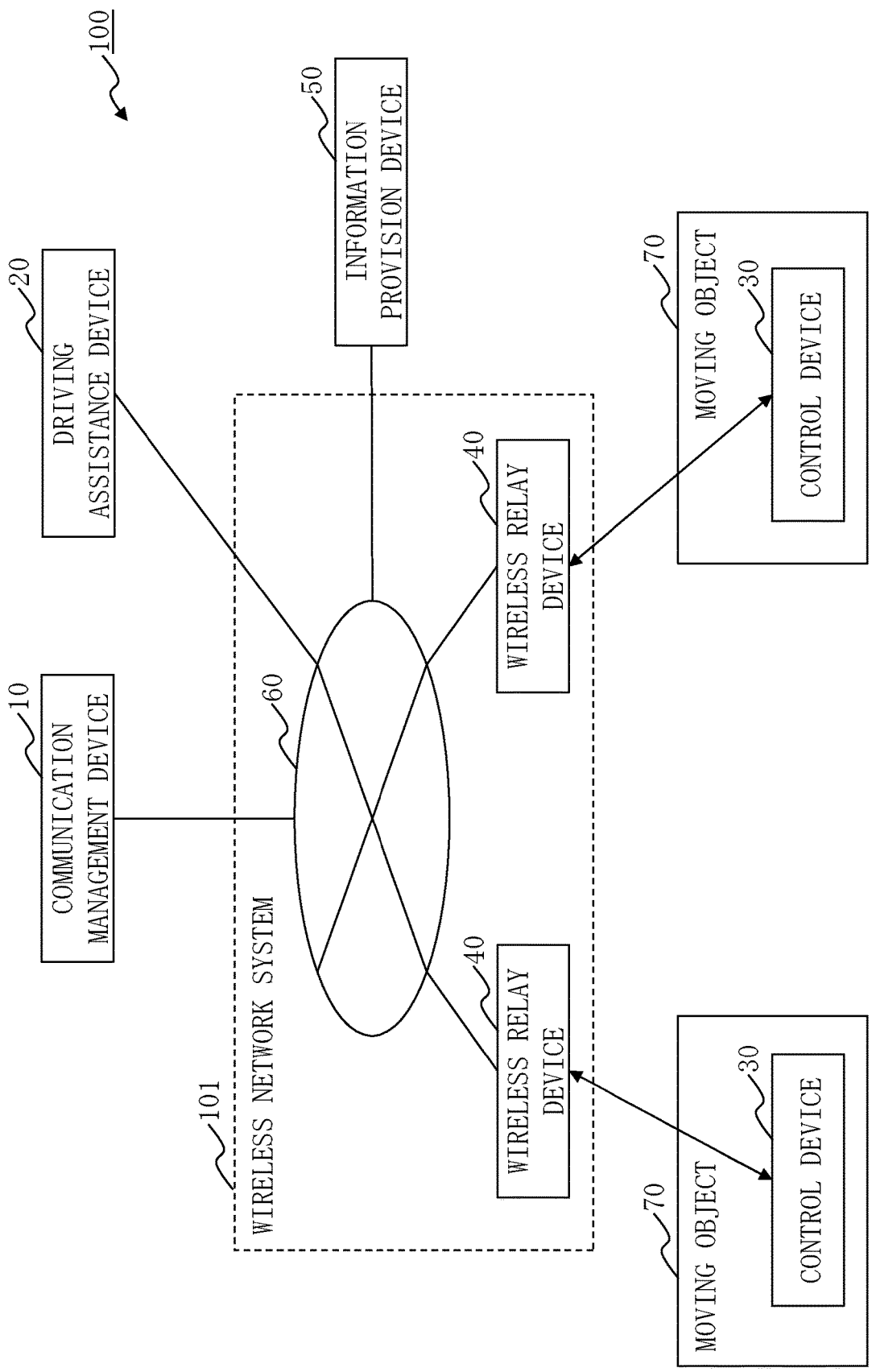
FIG. 1 is a configuration diagram of a driving assistance system 100 according to a first embodiment.

With reference to FIG. 1, description will be made on a configuration of a driving assistance system 100 according to a first embodiment.

The driving assistance system 100 includes a communication management device 10, a driving assistance device 20, one or more control devices 30, a plurality of wireless relay devices 40 and an information provision device 50.

The communication management device 10, the driving assistance device 20, the wireless relay devices 40 and the information provision device 50 are connected to a communication network 60. Each control device 30 is connected to the communication network 60 via any of the wireless relay devices 40. In this manner, it is possible for the communication management device 10, the driving assistance device 20, each control device 30, each wireless relay device 40 and the information provision device 50 to transmit and receive information with one another.

A wireless network system 101 is constituted by the plurality of wireless relay devices 40 and the communication network 60.

The communication management device 10 is a computer to manage quality of end-to-end communication between the driving assistance device 20 and the control device 30, and communication quality of the wireless network system 101.

The driving assistance device 20 is a computer to provide a driving assistance service to the control device 30 mounted on a moving object 70.

The control device 30 is a computer to control the moving objects 70 based on the driving assistance service provided from the driving assistance device 20. The control device 30 is mounted on the moving object 70. The moving object 70 is a vehicle such as a four-wheeled vehicle and a two-wheeled vehicle, etc. in the first embodiment. The moving object 70 is not limited to a vehicle, but may be of another kind such as a vessel.

The wireless relay devices 40 are computers to connect the control devices 30 to the communication network 60. The wireless relay devices 40 are computers constituting base stations in the communication network 60, as a concrete example.

The information provision device 50 is a computer to provide related information that influences control over the moving objects 70, such as weather information and road traffic information.

The communication network 60 is a wireless network such as a mobile communication network. The communication network is, for example, a 3G (3rd generation) network, an LTE (long term evolution) network, a 5G (5th generation) or a 6G (6th generation) network. Further, the communication network 60 may include a network such as a wireless LAN (local area network) and a wireless MAN (metropolitan area network).

Figure 2:
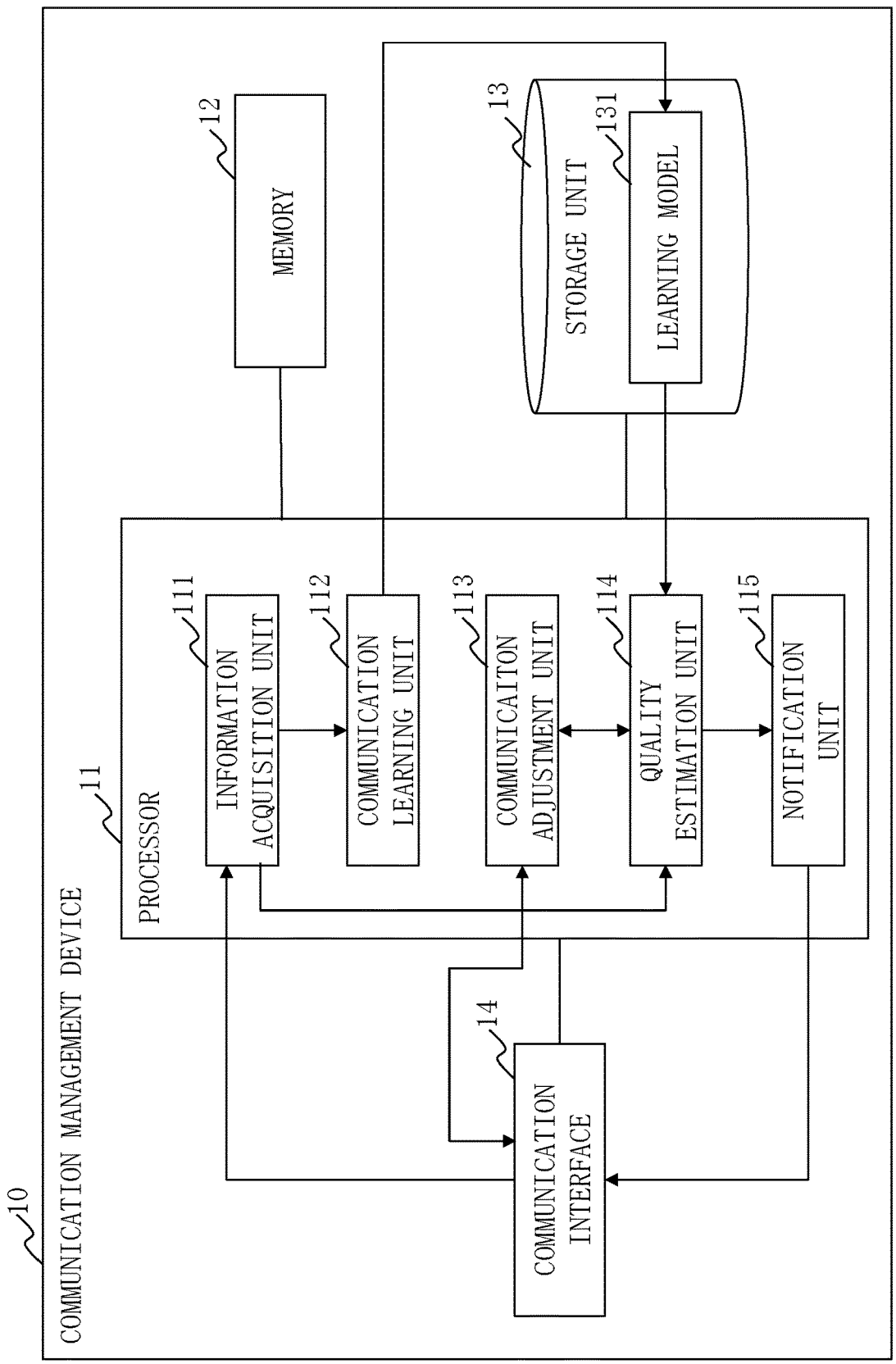
FIG. 2 is a configuration diagram of a communication management device 10 according to the first embodiment.

With reference to FIG. 2, description will be made on a configuration of the communication management device 10 according to the first embodiment.

The communication management device 10 includes hardware components of a processor 11, a memory 12, a storage unit 13 and a communication interface 14. The processor 11 is connected to other hardware components via a signal line, to control these other hardware components.

The communication management device 10 includes, as functional components, an information acquisition unit 111, a communication learning unit 112, a communication adjustment unit 113, a quality estimation unit 114 and a notification unit 115. Functions of each functional component of the communication management device 10 are realized by software.

The storage unit 13 stores a program to realize the functions of each functional component of the communication management device 10. This program is read into the memory 12 by the processor 11, and executed by the processor 11. In this manner, the functions of each functional component of the communication management device 10 are realized.

The storage unit 13 stores a learning model 131.

Figure 3:
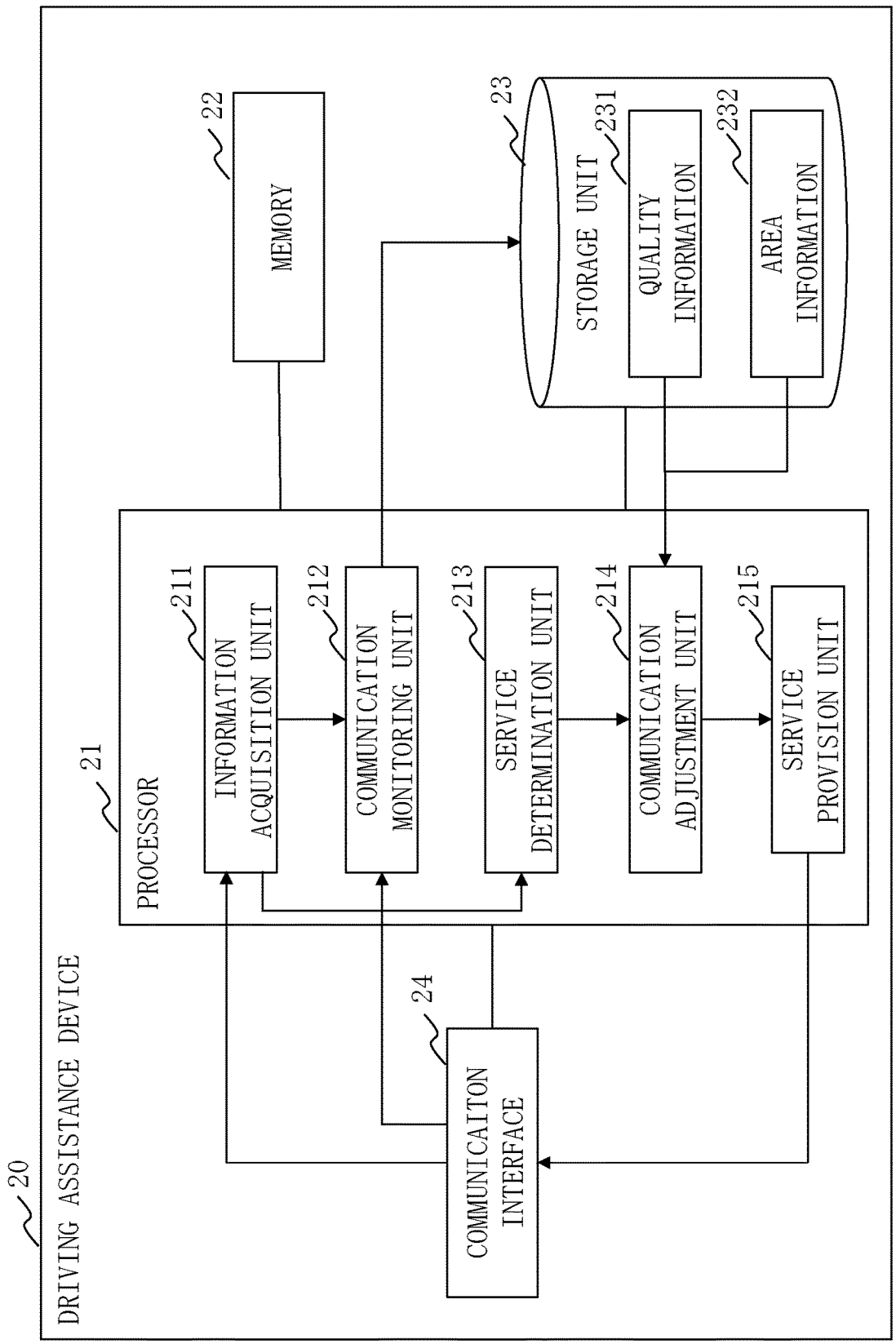
FIG. 3 is a configuration diagram of a driving assistance device 20 according to the first embodiment.

With reference to FIG. 3, description will be made on a configuration of the driving assistance device 20 according to the first embodiment.

The driving assistance device 20 includes hardware components of a processor 21, a memory 22, storage unit 23 and a communication interface 24. The processor 21 is connected to other hardware components via a signal line, to control these other hardware components.

The driving assistance device 20 includes, as functional components, an information acquisition unit 211, a communication monitoring unit 212, a service determination unit 213, a communication adjustment unit 214 and a service provision unit 215. The functions of each functional component of the driving assistance device 20 are realized by software.

The storage unit 23 stores a program to realize the functions of each functional component of the driving assistance device 20. The program is read into the memory 22 by the processor 21, and executed by the processor 21. In this manner, the functions of each functional component of the driving assistance device 20 are realized.

The storage unit 23 stores quality information 231 and area information 232.

Figure 4:
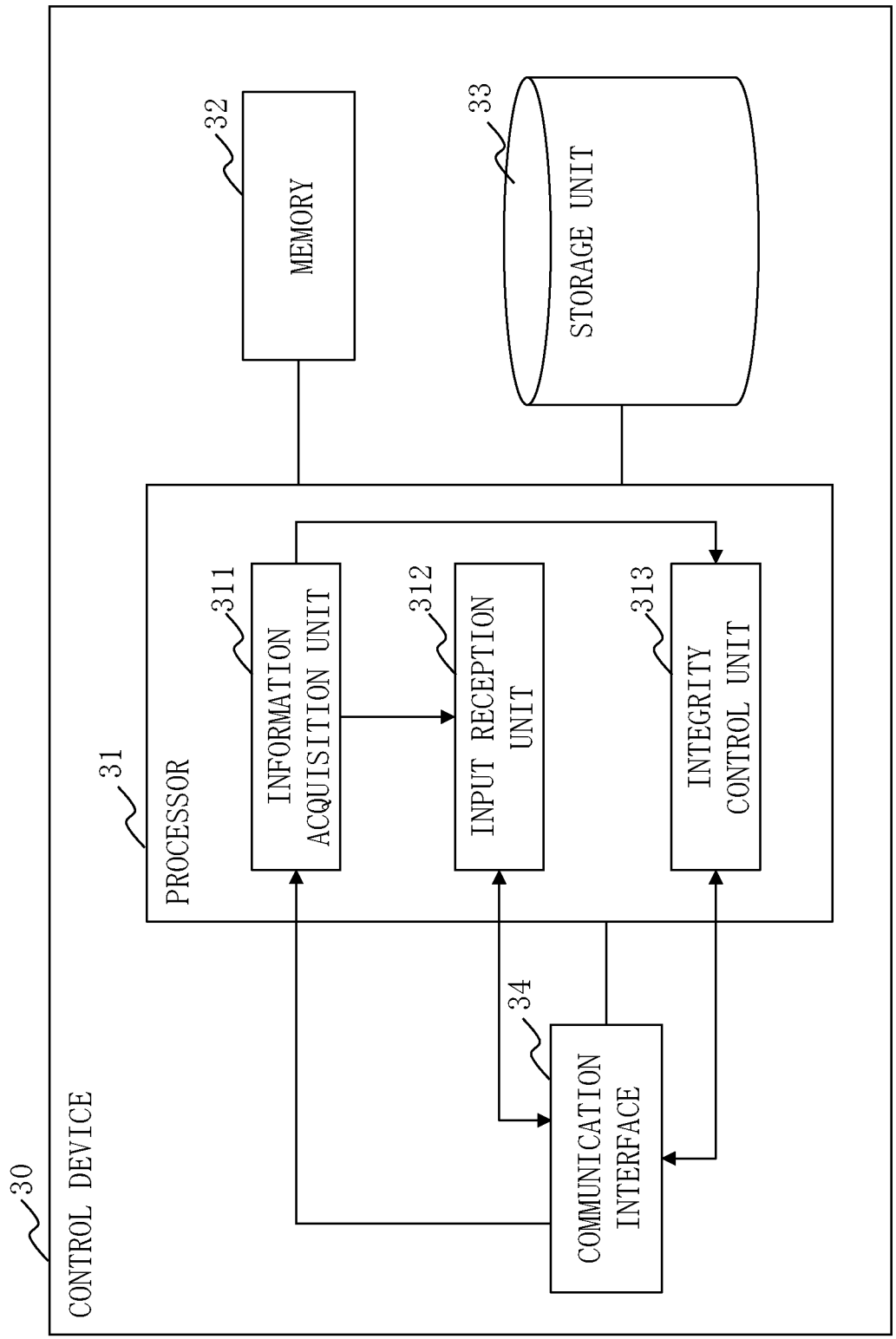
FIG. 4 is a configuration diagram of a control device 30 according to the first embodiment.

With reference to FIG. 4, description will be made on the control device 30 according to the first embodiment.

The control device 30 includes hardware components of a processor 31, a memory 32, storage unit 33 and a communication interface 34. The processor 31 is connected to other hardware components via a signal line, to control these other hardware components.

The control device 30 includes, as functional components, an information acquisition unit 311, an input reception unit 312 and an integrity control unit 313. The functions of each functional component of the control device 30 are realized by software.

The storage unit 33 stores a program to realize the functions of each functional component of the control device 30. This program is read into the memory 32 by the processor 31, and executed by the processor 31. In this manner, the functions of each functional component of the control device 30 are realized.

Figure 5:
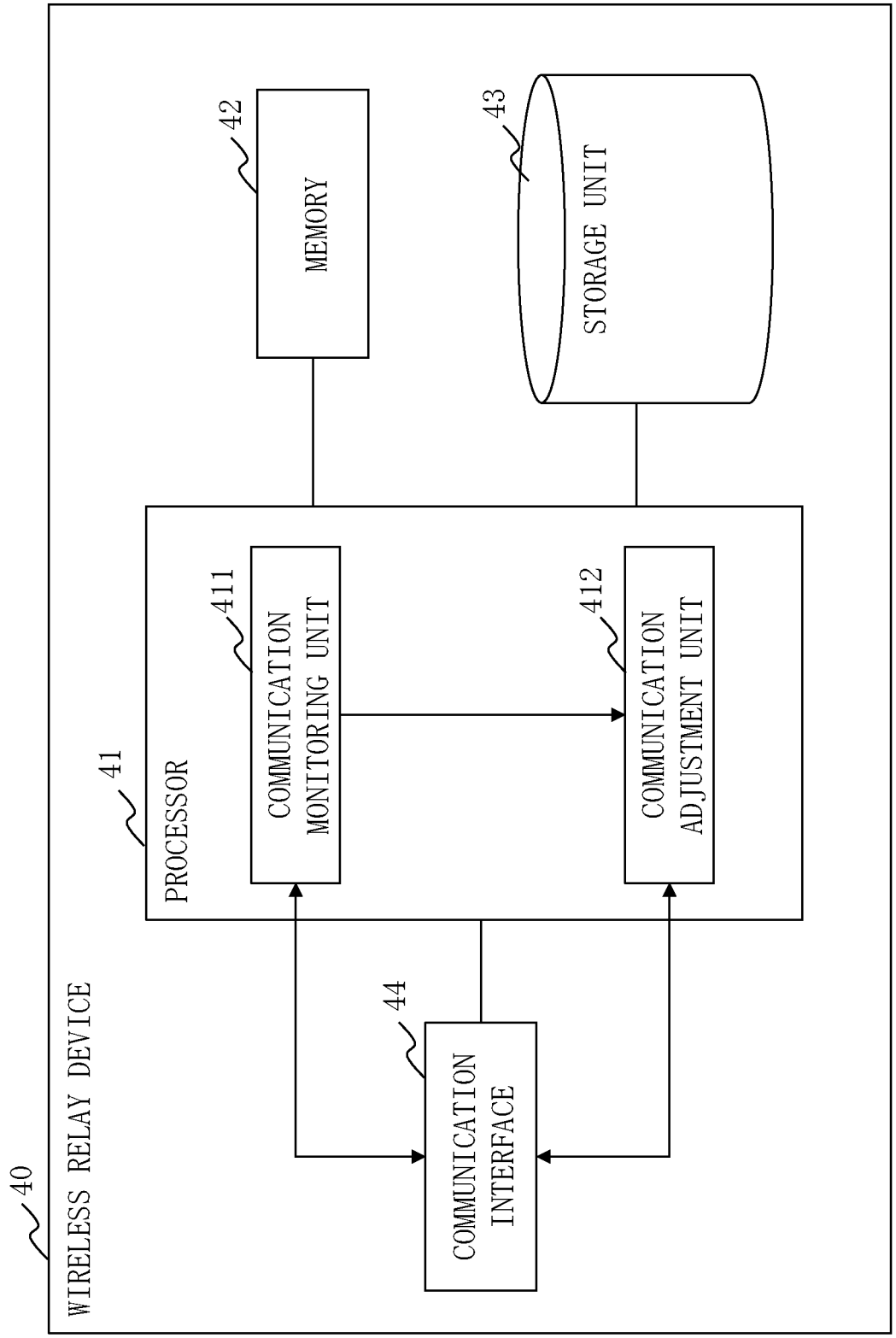
FIG. 5 is a configuration diagram of a wireless relay device 40 according to the first embodiment.

With reference to FIG. 5, description will be made on a configuration of wireless relay devices 40 according to the first embodiment.

The wireless relay device 40 includes hardware components of a processor 41, a memory 42, a storage unit 43 and a communication interface 44. The processor 41 is connected to other hardware components via a signal line, to control these other hardware components.

The wireless relay device 40 includes, as functional components, a communication monitoring unit 411 and a communication adjustment unit 412.

Functions of each functional component of the wireless relay device 40 are realized by software.

The storage unit 43 stores a program to realize the functions of each functional component of the wireless relay device 40. This program is read into the memory 42 by the processor 41, and executed by the processor 41. In this manner, the functions of each functional component of the wireless relay device 40 are realized.

The processors 11, 21, 31 and 41 are ICs (integrated circuits) to perform processing. The processors 11, 21, 31 and 41 are, for example, CPUs (central processing units), DSPs (digital signal processors) or GPUs (graphics processing units).

The memories 12, 22, 32 and 42 are storage devices to temporarily store data.

The memories 12, 22, 32 and 42 are SRAMs (static random access memories) and DRAMs (dynamic random access memories).

The storage units 13, 23, 33 and 43 are storage devices to store data. The storage units 13, 23, 33 and 43 are HDDs (hard disk drives), for example. Further, the storage units 13, 23, 33 and 43 may be portable recording media such as SD (registered trademark, secure digital) memory cards, CF (CompactFlash, registered trademark), NAND flash, flexible disks, optical disks, compact disks, Blue-ray (registered trademark) disks. DVDs (digital versatile disks).

The communication interfaces 14, 24, 34 and 44 are interfaces to connect with the communication network 60. The communication interfaces 14, 24, 34 and 44 are communication antennas, for example.

In FIG. 2, only one processor 11 is illustrated. However, there may be a plurality of processors 11, and the plurality of processors 11 may perform a program to realize each function in cooperation with one another. Similarly, there may be a plurality of processors 21, 31 and 41, and the plurality of processors 21, 31 and 41 may perform a program to realize each function in cooperation with one another.

\*\*\*Description of Operation\*\*\*

With reference to FIG. 6 through FIG. 9, description will be made on the driving assistance system 100 according to the first embodiment.

The operation procedure of the communication management device 10 in the driving assistance system 100 according to the first embodiment corresponds to a communication management method according to the first embodiment. Further, a program to realize the operation of the communication management device 10 in the driving assistance system 100 according to the first embodiment corresponds to a communication management program according to the first embodiment.

The operation procedure of the driving assistance device 20 in the driving assistance system 100 according to the first embodiment corresponds to a driving assistance method according to the first embodiment. Further, a program to realize the operation of the driving assistance device 20 in the driving assistance system 100 according to the first embodiment corresponds to a driving assistance program according to the first embodiment.

The operation of the driving assistance system 100 includes a learning process and a driving assistance process.

Figure 6:
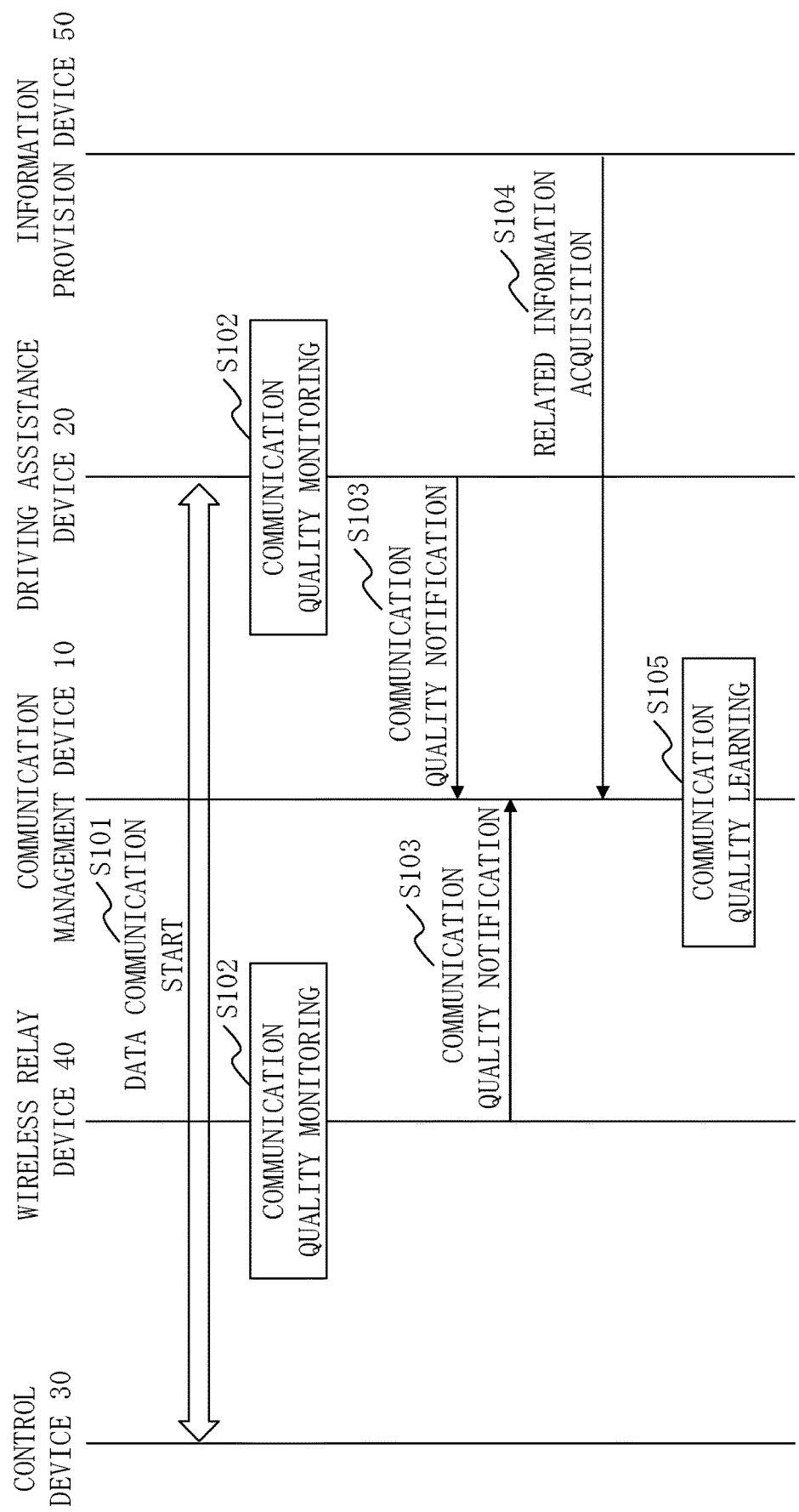
FIG. 6 is a processing flowchart of a learning process according to the first embodiment.

With reference to FIG. 6, description will be made on the learning process according to the first embodiment.

The learning process is a process to make a learning model 131 to estimate communication quality between the driving assistance device 20 and the control device 30 learn.

(Step S101: Data Communication Process)

Data communication is started between the driving assistance device 20 and the control device 30. The process until data communication is started will be described in a description of the driving assistance process.

(Step S102: Quality Monitoring Process)

Each wireless relay device 40 and the driving assistance device 20 specify communication quality.

The communication monitoring unit 411 of each wireless relay device 40 monitors a transmission and reception status of data via the communication interface 44. In this manner, the communication monitoring unit 411 specifies the communication quality of the wireless network system 101.

Specifically, the communication monitoring unit 411 measures indexes such as transmission power and a bit error rate. The communication monitoring unit 411 calculates indexes representing communication quality such as radio field intensity, a delay time of data transmission, and uplink and downlink data rates in the communication network 60, from the indexes measured. Then, the communication monitoring unit 212 specifies statistical information such as the mean value, the maximum value, the minimum value and a standard deviation in a certain time of the indexes representing the communication quality, as the communication quality of the wireless network system 101. In this case, the communication monitoring unit 411 also measures the number of connection of a device existing under control of the wireless relay devices 40, and calculates the statistical information. The device existing under control of the wireless relay devices 40 is the control device 30 and a smartphone of a pedestrian, etc.

Since the measurement method of communication quality of the communication network 60 is already known, details thereof are omitted.

The communication monitoring unit 212 of the driving assistance device 20 monitors the transmission and reception status of data via the communication interface 24. In this manner, the communication monitoring unit 212 specifies end-to-end communication quality between the driving assistance device 20 and the control device 30.

Specifically, the communication monitoring unit 212 measures an index such as an RTT (round trip time) and a packet loss, etc. between the driving assistance device 20 and the control device 30. The communication monitoring unit 212 calculates an index representing communication quality such as a delay time of end-to-end data transmission, and uplink and downlink data rates, from the index measured. Then, the communication monitoring unit 212 specifies statistical information such as the mean value, the maximum value, the minimum value and a standard deviation in a certain time of the index representing the communication quality, as the end-to-end communication quality.

The measurement method of an RTT, etc. between the driving assistance device 20 and the control device 30 by the communication monitoring unit 212 will be described.

In the data communication started in Step S101, the service provision unit 215 of the driving assistance device 20 sets driving assistance information inside a message for the control device 30, and also sets a sequence number to identify the message and a data transmission time. The driving assistance information is information such as a vehicle speed, a steering angle and a target position if a type of the driving assistance service is a remote operation service. Further, the service provision unit 215 sets the sequence number included in the message received from the control device 30 and a reception time of this message in the message for the control device 30.

In the data communication started in Step S101, the integrity control unit 313 of the control device 30 sets vehicle state information such as a vehicle speed and a steering angle of the moving object 70, and photographing information and object information around the moving object 70, and also sets a sequence number to identify the message and a data transmission time, in a message for the driving assistance device 20. Further, the integrity control unit 313 sets the sequence number included in the message received from the driving assistance device 20 and the reception time of this message.

By setting the sequence number and the transmission and reception times of the message in the message in this manner, the communication monitoring unit 212 is capable of calculating a time (RTT) required in receiving and transmitting the message, a transfer time of the message from the driving assistance device 20 to the control device 30, and a transfer time of the message from the control device 30 to the driving assistance device 20.

(Step S103: Quality Notification Process)

The communication monitoring unit 411 of each wireless relay device 40 and the communication monitoring unit 212 of the driving assistance device 20 transmit communication quality information indicating communication quality specified to the communication management device 10. In this case, with respect to a communication area of each wireless relay device 40, the communication monitoring unit 212 of the driving assistance device 20 also transmits a type of the driving assistance service provided for the control device 30 mounted on the moving object 70 existing in the communication area to the communication management device 10.

The information acquisition unit 111 of the communication management device 10 integrates and writes into the storage unit 13 the communication quality information and the type of the driving assistance service.

(Step S104: Related Information Acquisition Process)

The information acquisition unit 111 of the communication management device 10 acquires related information with respect to the communication area of each wireless relay device 40, which influences control over the moving object 70, such as weather information and road traffic information, from the information provision device 50. The information acquisition unit 111 writes the related information in the storage unit 13.

(Step S105: Communication Learning Process)

The communication learning unit 112 of the communication management device 10 generates a learning model 131 to estimate the communication quality, from quality statistics indicating communication quality in the past with respect to each communication area indicated in the communication quality information acquired in Step S103, and a control condition in the past with respect to each communication area indicated in the related information, etc. acquired in Step S104. The communication learning unit 112 generates the learning model 131 by analyzing a correlation between the communication quality and the control condition with respect to each communication area. The learning model 131 is a model to output an estimated value of the communication quality when the control condition is provided as an input. The learning model 131 may be also regarded as a model to output the estimated value of the communication quality by using communication quality at a time close to the time to be estimated, in addition to the control condition, as an input.

Specifically, the communication learning unit 112 analyzes a correlation between the communication quality and the control condition by using a machine learning method such as a neural network and a support vector machine. In this case, the communication learning unit 112 generates a learning model 131 to estimate communication quality of the wireless network system 101, and a learning model 131 to estimate end-to-end communication quality between the driving assistance device 20 and the control device 30. The communication learning unit 112 may generate a learning model 131 to estimate the communication quality of the wireless network system 101 for each communication area of the wireless relay device 40. The communication leaning unit 112 may generate a learning model to estimate the end-to-end communication quality for each pair of the driving assistance device 20 and each control device 30. The communication learning unit 112 writes the learning model 131 generated in the storage unit 13.

The quality statistics used as an input in generating a learning model 131 by the communication learning unit 112 specifically include information as follows:

(1) communication quality for each time and date in the past with respect to each communication area (2) weather condition such as weather, temperature, humidity, precipitation probability, and wind speed with respect to each communication area; (3) traffic condition such as whether it is during a long vacation, whether there is a large event in each communication area, whether an accident occurs in each communication area, and whether there is a voluntary restraint on outings in each communication area; (4) the number and an attribute of a moving object in or in the vicinity of the communication area; and (5) type of a driving assistance service provided in each communication area. (2), (3) and (4) are control conditions indicated in the related information, and (5) is the control condition acquired in Step S103.

Figure 7:
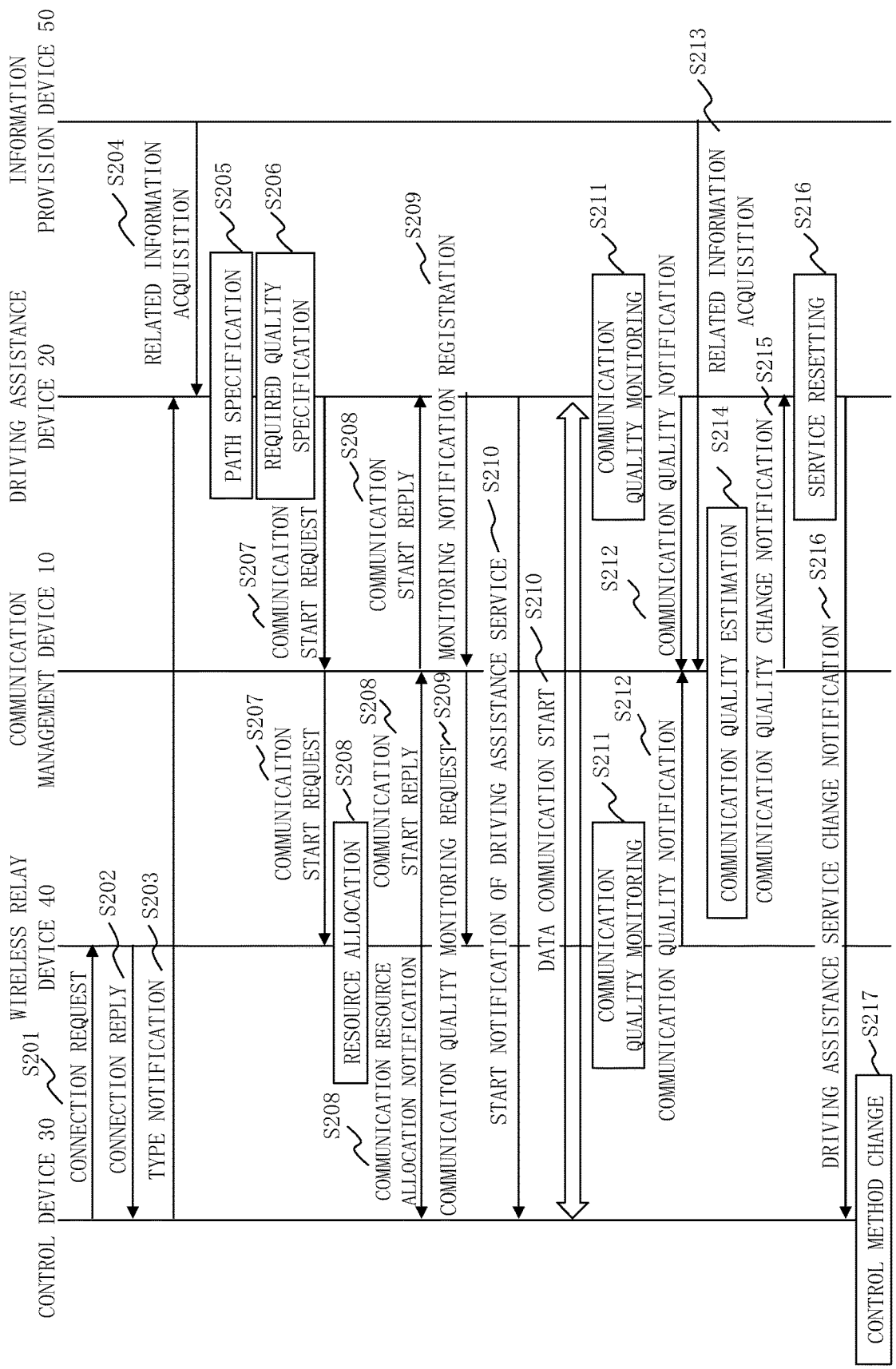
FIG. 7 is a processing flowchart of a driving assistance process according to the first embodiment.

With reference to FIG. 7, description will be made on a driving assistance process according to the first embodiment.

The driving assistance process is a process to predict communication quality in the future by using the learning model 131 generated in the learning process, and to control the driving assistance service provided based on the communication quality predicted.

(Step S201: Connection Request Process)

The input reception unit 312 of the control device 30 mounted on the moving object 70 receives input of a type of a driving assistance service to be used from a driver of a vehicle being the moving object 70. When the type of the driving assistance service is input, the input reception unit 312 transmits a request to connect with the communication network 60 to the wireless relay device 40.

The driving assistance service is a service provided by the driving assistance device. As types of the driving assistance service, there are a remote operation service of remote-type automatic driving, a remote monitoring service of remote-type automatic driving, a dynamic map generation service of autonomous automatic driving, and a surrounding environment information provision service. The remote operation service of remote-type automatic driving is a service to provide the control device 30 with operation information to operate the moving object 70 from the driving assistance device 20, and to control the moving object 70 based on the operation information. The remote monitoring service of remote-type automatic driving is a service to acquire information on the moving object 70 from the control device 30 by the driving assistance device 20, and to monitor a traveling state of the moving object 70. The dynamic map generation service of autonomous automatic driving is a service to provide the control device 30 with a dynamic map around the moving object 70 from the driving assistance device 20, and to make the control device 30 control the moving object 70 based on the dynamic map. The surrounding environment information provision service is a service to provide the control device 30 with surrounding environment information required to control the moving object 70 such as an obstacle around the moving object 70, from the driving assistance device 20.

(Step S202: Connection Reply Process)

The communication adjustment unit 412 of the wireless relay device 40 receives a connection request transmitted in Step S201. Then, the communication adjustment unit 412 transmits a connection reply to allow connection to the control device 30.

(Step S203: Type Notification Process)

The integrity control unit 313 of the control device 30 receives the connection reply transmitted in Step S202. Then, the integrity control unit 313 of the control device 30 transmits a start request of the driving assistance service to the driving assistance device 20. The start request of the driving assistance service includes an identification number to uniquely represent the moving object 70, destination information representing a destination, location information representing a location of the moving object 70, and a type of the driving assistance service input in Step S201.

(Step S204: Related Information Acquisition Process)

The information acquisition unit 211 of the driving assistance device 20 acquires related information with respect to the communication area of each wireless relay device 40, the related information being related to automatic driving, such as weather information and road traffic information, from the information provision device 50. The communication area of each wireless relay device 40 is indicated in the area information 232. The information acquisition unit 211 writes the related information in the storage unit 23.

(Step S205: Path Specification Process)

The service determination unit 213 of the driving assistance device 20 receives the start request of the driving assistance service transmitted in Step S203. Then, the service determination unit 213 specifies a scheduled path being a path from a location indicated in location information included in the start request of the driving assistance service to a destination indicated in destination information. The service determination unit 213 specifies, as a scheduled path, a path being a shortest distance, or a path which makes it possible to reach the destination in a shortest time by using congestion information included in the road traffic information, etc.

(Step S206: Required Quality Specification Process)

The communication adjustment unit 214 of the driving assistance device 20 specifies communication quality required based on the type of the driving assistance service included in the start request of the driving assistance service. Specifically, the communication adjustment unit 214 specifies communication quality required for the type of the driving assistance service by referring to the quality information 231.

As illustrated in FIG. 8, the quality information 231 stores required communication quality for each type. In FIG. 8, the quality information 231 stores required communication quality for each of a case wherein a high-quality driving assistance service is provided, a case wherein a standard driving assistance service is provided and a case wherein a low-quality driving assistance service is provided. The contents of the driving assistance service are determined for each quality of the driving assistance service. For example, the contents of data to be transferred, and information such as a compression rate are determined for each quality of the driving assistance service. As illustrated in FIG. 9, the communication quality represents a delay time, a data rate (UL) and a data rate (DL). The data rate (UL) is an uplink data rate, and the data rate (DL) is a downlink data rate. As illustrated in FIG. 9, it is described that the smaller the value set in the communication quality is, the higher the quality is. By referring to the quality information 231, and specifying the communication quality corresponding to the type of the driving assistance service, the communication adjustment unit 214 specifies required communication quality. For example, the communication adjustment unit 214 specifies the value of the communication quality in the case wherein a high-quality driving assistance service is provided.

It is necessary to specify required communication quality for the wireless network system 101, and required quality of end-to-end communication between the driving assistance device 20 and the control device 30. In the first embodiment, a piece of quality information 231 is prepared separately for each communication quality. Then, the communication adjustment unit 214 refers to corresponding quality information 231, and specifies each piece of communication quality.

(Step S207: Communication Start Request Process)

The communication adjustment unit 214 of the driving assistance device 20 transmits a communication start request to the communication management device 10. The communication start request includes an identification number of the moving object 70 whereon the control device 30 being a communication destination is mounted, and quality information indicating the communication quality specified in Step S206.

When receiving the communication start request, the communication adjustment unit 113 of the communication management device 10 transmits the communication start request to the wireless relay device 40 whereto the control device 30, whereon the moving object 70 specified from an identification number included in the communication start request is mounted, is connected. The communication adjustment unit 113 transmits information indicating the communication quality of the wireless network system 101 in the quality information included in the communication start request by replacing the information with information corresponding to the wireless network system 101. For example, when the wireless communication network is an LTE network, the communication adjustment unit 113 replaces the information indicating communication quality of the communication network 60 with a value of a QCI (QoS (quality of service) class indicator) being a value of the communication quality defined by a 3GPP (3rd generation partnership project) standard. Further, when the wireless communication network is a 5G network, the communication adjustment unit 113 replaces the information indicating the communication quality of the communication network 60 with a value of a 5QI (5G QoS indicator).

(Step S208: Resource Allocation Process)

The communication adjustment unit 412 of the wireless relay device 40 receives the communication start request transmitted in Step S207. Then, the communication adjustment unit 412 decides whether it is possible to allocate communication quality of the communication network 60 in the quality information included in the communication start request.

When allocation is possible, the communication adjustment unit 412 transmits a communication resource allocation notification including information of the communication quality allocated to the control device 30, and indicating permission to start communication. Then, the communication adjustment unit 412 transmits a communication start reply to the communication management device 10. The communication adjustment unit 113 of the communication management device 10 receives the communication start reply, and transmits the communication start reply to the driving assistance device 20.

When allocation is impossible, the communication adjustment unit 412 transmits a communication start reply indicating non-permission to start communication to the communication management device 10. The communication adjustment unit 113 of the communication management device 10 receives the communication start reply, and transmits a communication start reply to the driving assistance device 20. When receiving the communication start reply indicating non-permission to start communication, the communication adjustment unit 214 of the driving assistance device resets communication quality, and transmits the communication start request again. For example, the communication adjustment unit 214 resets communication quality by specifying required communication quality in a case wherein quality to provide the driving assistance service is reduced.

(Step S209: Communication Monitoring Process)

When receiving the communication start reply indicating permission to start communication, the communication adjustment unit 214 of the driving assistance device 20 transmits a monitoring notification registration of communication quality to the communication management device 10. The communication monitoring notification registration includes information indicating a communication destination to be monitored, a communication monitoring object area and a parameter for monitoring.

The information indicating the communication destination to be monitored is an identification number of the moving object 70 and a type of the communication assistance service. The communication monitoring object area specifies a communication area including a scheduled path based on the scheduled path and the area information 232, and sets the wireless relay device 40 corresponding to the communication area specified. The parameter for monitoring includes a range of standard quality, a communication monitoring cycle, a communication quality estimation time and a change time of communication quality.

The range of the standard quality is a threshold value to detect change in communication quality, and is set in accordance with settings of the quality information 231. By storing the same quality information 231 in the communication management device 10 and the driving assistance device 20, it is possible to easily communicate information between devices. The communication monitoring cycle is a cycle to monitor the communication quality. As the communication monitoring cycle, 100 times worth of the time taken for transmitting driving assistance information from the driving assistance device 20 to the control device 30 is set. That is, if a transmission cycle of the driving assistance information is 10 milliseconds, the communication monitoring cycle is 10 seconds. The communication quality estimation time is a time in the future at which the communication quality is to be estimated. As the communication quality estimation time, a scheduled time to pass through the area concerned is set based on the scheduled path. The change time of communication quality is a time required to change the driving assistance service. That is, the change time of communication quality is set based on the time, etc. required on the side of the control device 30 in switching the type of driving assistance service. The time required on the side of the control device 30 is a time, etc. to transfer to a driver who becomes necessary in switching from automatic driving to manual driving.

The communication adjustment unit 113 of the communication management device 10 receives the monitoring notification registration of the communication quality from the driving assistance device 20. The communication adjustment unit 113 transmits a communication quality monitoring request to the wireless relay device 40 set in the communication monitoring object area included in the monitoring notification registration. The communication quality monitoring request includes the communication monitoring cycle as the parameter for monitoring.

(Step S210: Data Communication Process)

When the communication adjustment unit 214 receives the communication start reply, the service provision unit 215 of the driving assistance device 20 transmits a driving assistance service start notification to the control device 30. Then, data communication is started between the driving assistance device 20 and the control device 30. After that, the service provision unit 215 of the driving assistance device 20 generates driving assistance information in accordance with the type of the driving assistance service, and regularly transmits the driving assistance information to the control device 30.

The integrity control unit 313 of the control device 30 acquires environment information around the moving object 70 and state information of the moving object 70, and regularly transmits the environment information and the state information to the driving assistance device 20. The environment information is information around the moving object 70 acquired by a camera mounted on the moving object 70, and a sensor such as a LiDAR (light detection and ranging), etc. The environment information is, for example, photographed data by a camera and information of a surrounding object acquired as a result of analyzing the photographed data, etc. The state information is information indicating a behavior of the moving object 70 acquired from various apparatuses mounted on the moving object 70, being information such as a vehicle speed and a steering angle. The integrity control unit 313 transmits the environment information and the state information, etc. after changing a compression ratio of the environment information and the state information, etc. based on the communication quality notified by a communication resource allocation notification from the wireless relay device 40.

The integrity control unit 313 of the control device 30 determines a moving method of the moving object 70 using the driving assistance information transmitted from the driving assistance device 20, and the environment information and the state information, and controls the behavior of the moving object 70.

The processes from Step S211 through Step S213 are the same as the processes from Step S102 through Step S104 of FIG. 6.

(Step S214: Quality Estimation Process)

The quality estimation unit 114 of the communication management device 10 sets a communication area of each wireless relay device 40 set in the communication monitoring object area included in the monitoring notification registration, as a communication area being an object. The quality estimation unit 114 estimates communication quality at a scheduled time between the driving assistance device 20 and the control device 30 with respect to the communication area as the object, by using present communication quality and a control condition indicated in the related information with respect to the communication area being the object, and the learning model 131 generated in the process indicated in FIG. 6, at a time prior to the change time of the communication quality with respect to the scheduled time to pass through the communication area being the object. For example, when it comes to a time prior to the scheduled time by a time obtained by adding a fixed period to the change time of the communication quality, the quality estimation unit 114 estimates communication quality at the scheduled time with respect to the communication area being the object. In this case, the quality estimation unit 114 estimates the communication quality at the scheduled time with respect to the communication area being the object by providing the learning model 131 with the present communication quality and the control condition indicated in the related information, etc. of the communication area being the object, as input, and acquiring an estimated value of the communication quality output.

When the communication quality of the wireless network system 101 is estimated, the quality estimation unit 114 uses the learning model 131 for the wireless network system 101, and w % ben the quality of end-to-end communication is estimated, the quality estimation unit 114 uses the leaning model 131 for end-to-end. When the learning model 131 is generated for each communication area of the wireless relay devices 40, the quality estimation unit 114 uses a learning model 131 corresponding to the communication area to be estimated. When a learning model 131 is generated for each pair of the driving assistance device 20 and the control device 30, the quality estimation unit 114 uses a learning model 131 corresponding to the pair to be estimated.

Above, the quality estimation unit 114 has acquired the estimated value of the communication quality at the scheduled time. However, the quality estimation unit 114 may classify the communication quality by levels, and acquire a probability of the communication quality to become each level at the scheduled time. Then, for example, the quality estimation unit 114 may estimate the communication quality to be at a level of the highest probability.

(Step S215: Quality Notification Process)

When the communication quality estimated in Step S214 is outside the range of the standard quality, the notification unit 115 of the communication management device 10 transmits a communication quality change notification to notify the driving assistance device 20 of the communication quality estimated. When at least any of the communication quality of the wireless network system 101 and the quality of end-to-end communication is outside the range of the standard quality, the notification unit 115 transmits the communication quality change notification.

As the range of the standard quality, it is assumed that a lower limit of the communication quality is set. Therefore, when any communication quality estimated in Step S214 becomes lower than the lower limit of the standard quality, the notification unit 115 transmits the communication quality change notification. The communication quality change notification indicates a communication area where change in communication quality is predicted, and communication quality estimated. When a probability of being the communication quality estimated is calculated, the communication quality change notification may indicate the probability.

(Step S216: Service Resetting Process)

The communication adjustment unit 214 of the driving assistance device 20 receives the communication quality change notification transmitted in Step S215. Then, the communication adjustment unit 214 decides whether it is possible to continue the driving assistance service based on the communication monitoring object area and the communication quality indicated in the communication quality change notification. Specifically, the communication adjustment unit 214 decides whether it is possible to provide the driving assistance service currently provided, with the communication quality indicated in the communication quality change notification. When it is possible to provide the driving assistance service currently provided, the communication adjustment unit 214 decides that it is possible to continue the driving assistance service, and when it is impossible to provide the driving assistance service currently provided, the communication adjustment unit 214 decides that it is impossible to continue the driving assistance service.

As a specific example, it is assumed that when a remote operation service of remote-type automatic driving is being operated with "communication quality level=high-quality", the communication adjustment unit 214 receives a communication quality change notification indicating "communication quality level=normal communication quality". In this case, since it is possible to perform the remote operation service of remote-type automatic driving even with the communication quality estimated, the communication adjustment unit 214 decides that it is possible to continue the driving assistance service. Further, as another specific example, it is assumed that when a remote operation service of remote-type automatic driving is being operated with "communication quality level=low-quality", the communication adjustment unit 214 receives a communication quality change notification indicating "communication quality level=less than low-quality". In this case, since it is impossible to perform the remote operation service of remote-type automatic driving with the communication quality estimated, the communication adjustment unit 214 decides that it is impossible to continue the driving assistance service.

The service provision unit 215 of the driving assistance device 20 resets the driving assistance service based on whether is it possible to continue the driving assistance service and the decision result.

Specifically, when it is decided to be possible to continue the driving assistance service, the service provision unit 215 performs resetting so as to reduce the communication traffic volume while continuing providing the driving assistance service currently provided. For example, the service provision unit 215 makes a change such as to increase a compression ratio of the photographed data notified from the control device 30 in the remote operation service of remote-type automatic driving.

Further, when it is decided that continuing the driving assistance service is impossible, the service provision unit 215 switches the driving assistance service to be provided to a driving assistance service which can be provided in the communication quality estimated. For example, the service provision unit 215 makes a change such as to switch the remote operation service of remote-type automatic driving to a surrounding environment information provision service.

The service provision unit 215 of the driving assistance device 20 transmits a driving assistance service change notification to notify the control device 30 of a change content of the driving assistance service.

(Step S217: Control Method Change Process)

The integrity control unit 313 of the control device 30 receives the driving assistance service change notification transmitted in Step S216. Then, in response to the change content indicated in the driving assistance service change notification, the integrity control unit 313 changes a control method of the moving object 70.

As a specific example, when the compression ratio of the photographed data is increased, the integrity control unit 313 increases the compression ratio of photographed data to be transmitted to the driving assistance device 20 by one level, and reduces the size of photographed image data to be transmitted. Further, when the remote operation service of remote-type automatic driving is switched to the surrounding environment information provision service, the integrity control unit 313 displays start of manual driving associated with suspension of the automatic driving function on a display device, etc. mounted on the moving object 70, and notifies a driver of the moving object 70 of switching to manual driving. After that, the integrity control unit 313 stops control over apparatuses such as an accelerator, a brake and a steering, and switches to control notifying the driver of surrounding information.

Effect of First Embodiment

As describe above, in the driving assistance system 100 according to the first embodiment, the communication management device 10 notifies when the communication quality between the driving assistance device 20 and the control device 30 with respect to a communication area at a scheduled time at which the moving object 70 passes through the communication area becomes outside a range of standard quality. Then, when it is notified, the driving assistance device 20 resets the driving assistance service in accordance with the communication quality estimated. In this manner, it becomes possible to realize suitable control in accordance with the communication quality.

As a result, it becomes possible for the driving assistance device 20 and the control device 30 to recognize degradation of communication quality beforehand, and to take action to prevent degradation of the communication quality. In addition, it is possible to prevent emergency operation of the moving object 70 associated with sudden decline in communication quality, and to improve stability of control over the moving object 70.

\*\*\*Other Configuration\*\*\*

<First Variation>

In the first embodiment, when communication quality is estimated to decline, resetting of the driving assistance service is performed. As a first variation, when the communication quality is estimated to decline, the communication adjustment unit 214 may allocate a communication resource between each of the plurality of control devices 30 and the driving assistance device 20.

That is, the communication adjustment unit 214 may adjust a communication resource allocated to communication with each of the plurality of control devices 30, the communication resource being used to provide the driving assistance service to each of the plurality of control devices 30. Specifically, the communication adjustment unit 214 reduces a communication resource allocated to communication with a control device 30 with which a driving assistance service of low priority is provided among the plurality of control devices 30, and increases a communication resource allocated to communication with a control device 30 whereof the communication quality is estimated to decline. In this manner, there is a possibility to prevent communication quality from declining.

Figure 10:
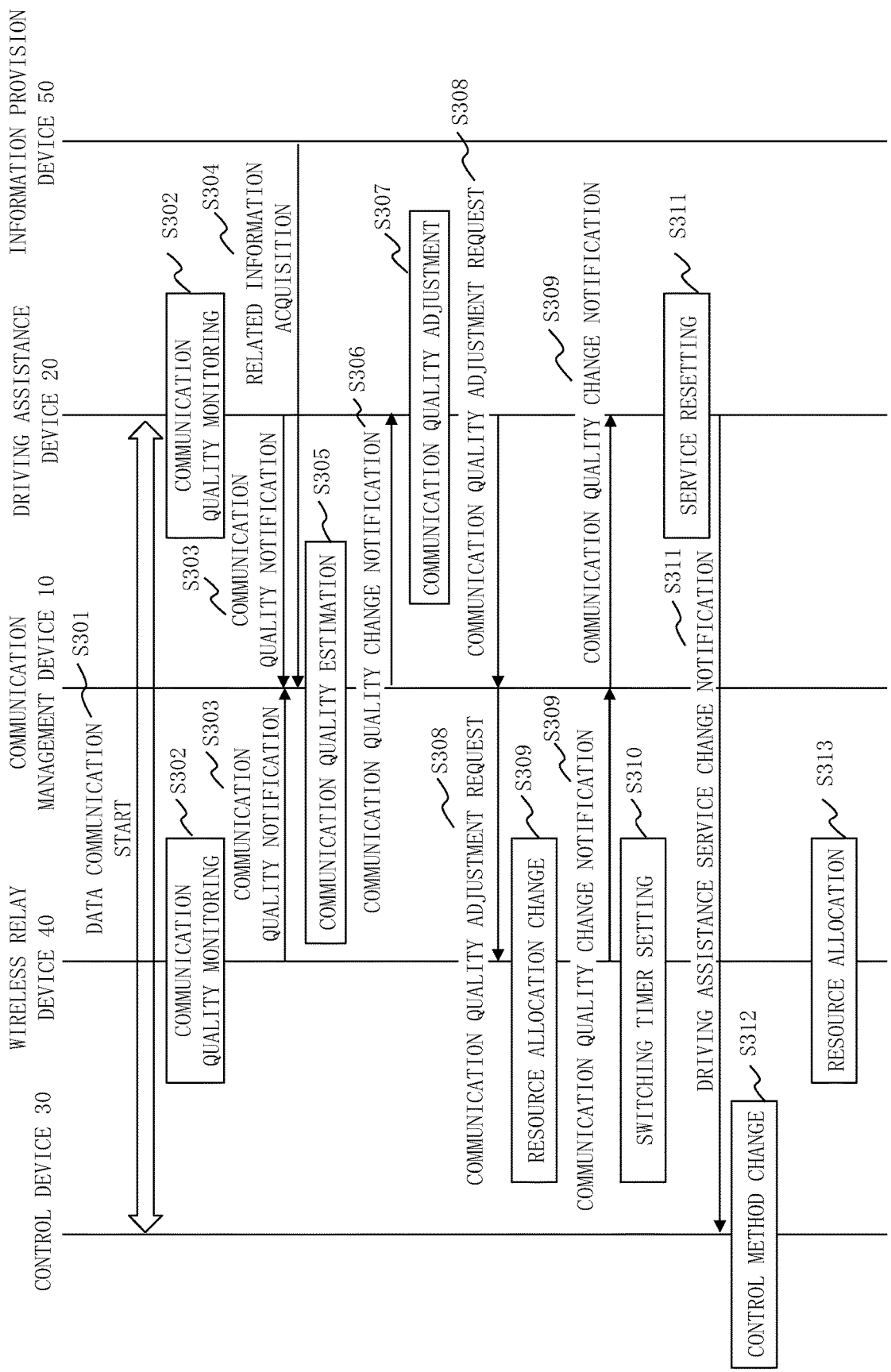
FIG. 10 is a processing flowchart of the driving assistance process according to a first variation.

With reference to FIG. 10, description will be made on a driving assistance process according to the first variation.

The processes from Step S301 through Step S306 are the same as the processes from Step S210 through Step S215 in FIG. 7.

(Step S307: Quality Adjustment Process)

The communication adjustment unit 214 of the driving assistance device 20 receives the communication quality change notification transmitted in Step S306. Then, the communication adjustment unit 214 decides whether to allow decline in communication quality based on a communication monitoring object area and communication quality indicated in the communication quality change notification. Specifically, the communication adjustment unit 214 decides whether the communication quality indicated in the communication quality change notification is communication quality of the communication wireless network system 101. When the communication quality indicated in the communication quality change notification is the communication quality of the wireless network system 101, the communication adjustment unit 214 decides to allow decline in communication quality, and when the communication quality indicated in the communication quality change notification is quality of end-to-end communication, the communication adjustment unit 214 decides not to allow decline in communication quality.

When the communication adjustment unit 214 decides not to allow decline in communication quality, the communication adjustment unit 214 specifies a driving assistance service of the lowest priority among driving assistance services being provided by the driving assistance device 20. The communication adjustment unit 214 degrades the communication quality allocated to communication with a control device 30 providing the driving assistance service specified. That is, the communication adjustment unit 214 reduces the communication resource allocated to communication with the control device 30 providing the driving assistance service specified. In this manner, the communication adjustment unit 214 secures the communication resource. Then, the communication adjustment unit 214 allocates the communication resource secured to communication with the control device 30 whereof the communication quality is estimated to decline. When the communication quality of the wireless network system 101 does not decline but the quality of end-to-end communication declines, congestion in a wired network between the driving assistance device 20 and the wireless relay device 40, etc. is considered to be a cause. Therefore, by reducing the communication resource allocated to others, and allocating the reduced part of the communication resource, it is possible to improve the quality of end-to-end communication.

The priority of the driving assistance service is, for example, the highest as for the remote operation service of remote-type automatic driving performing so far as driving control, and the lowest as for the surrounding environment information provision service only performing information provision. That is, the higher a degree to which suspension of the driving assistance service has an influence on safety, the higher the priority is.

(Step S308: Communication Start Request Process)

When it is decided to allow decline in communication quality in Step S307, the communication adjustment unit 214 of the driving assistance device 20 transmits a communication quality adjustment request to the communication management device 10. The communication quality adjustment request includes an identification number of the moving object 70 whereon the control device 30 being a communication destination is mounted, and quality information indicating communication quality of the wireless network system 101 indicated in the communication quality change notification transmitted in Step S306. According to this, change in allocation of the communication resource is requested so as to be the communication quality of the wireless network system 101 indicated in the communication quality change notification.

(Step S309: Resource Control Process)

The communication adjustment unit 412 of the wireless relay device 40 receives the communication start request transmitted in Step S308. Then, the communication adjustment unit 412 transmits a communication quality change notification to the driving assistance device 20. The communication quality change notification indicates communication quality after change and a time to change the communication quality. The communication quality after change is in general the same as the communication quality indicated in the communication quality adjustment request.

(Step S310: Switching Timer Setting Process)

The communication adjustment unit 412 of the wireless relay device 40 sets a switching timer to be activated at the time to change the communication quality.

(Step S311: Service Resetting Process)

When it is decided to allow decline in communication quality in Step S307, the service provision unit 215 of the driving assistance device 20 resets the driving assistance service as with Step S216 in FIG. 7. The service provision unit 215 of the driving assistance device 20 transmits a driving assistance service change notification to notify the control device 30 of a change content of the driving assistance service.

(Step S312: Control Method Change Process)

When the driving assistance service change notification is received, the integrity control unit 313 of the control device 30 changes a control method of the moving object 70 in accordance with the change content indicated in the driving assistance service change notification.

(Step S313: Resource Allocation Process)

When the switching timer is activated, the communication adjustment unit 412 of the wireless relay device 40 changes the communication quality into the communication quality after change indicated in the communication quality change notification.

As described above, when the quality of end-to-end communication is estimated to decline, the communication adjustment unit 214 of the driving assistance device 20 changes allocation of the communication quality between each of the plurality of control devices 30 and the driving assistance device 20. In this manner, it is possible to prevent the driving assistance service provided from being unstable due to sudden decline in communication quality while continuing provision of the driving assistance service of a high priority.

<Second Variation>

In the first embodiment, resetting of the driving assistance service is performed in accordance with communication quality in a communication area including a scheduled path after specifying the scheduled path. As the second variation, the scheduled path may be changed in accordance with the communication quality of the scheduled path.

Figure 11:
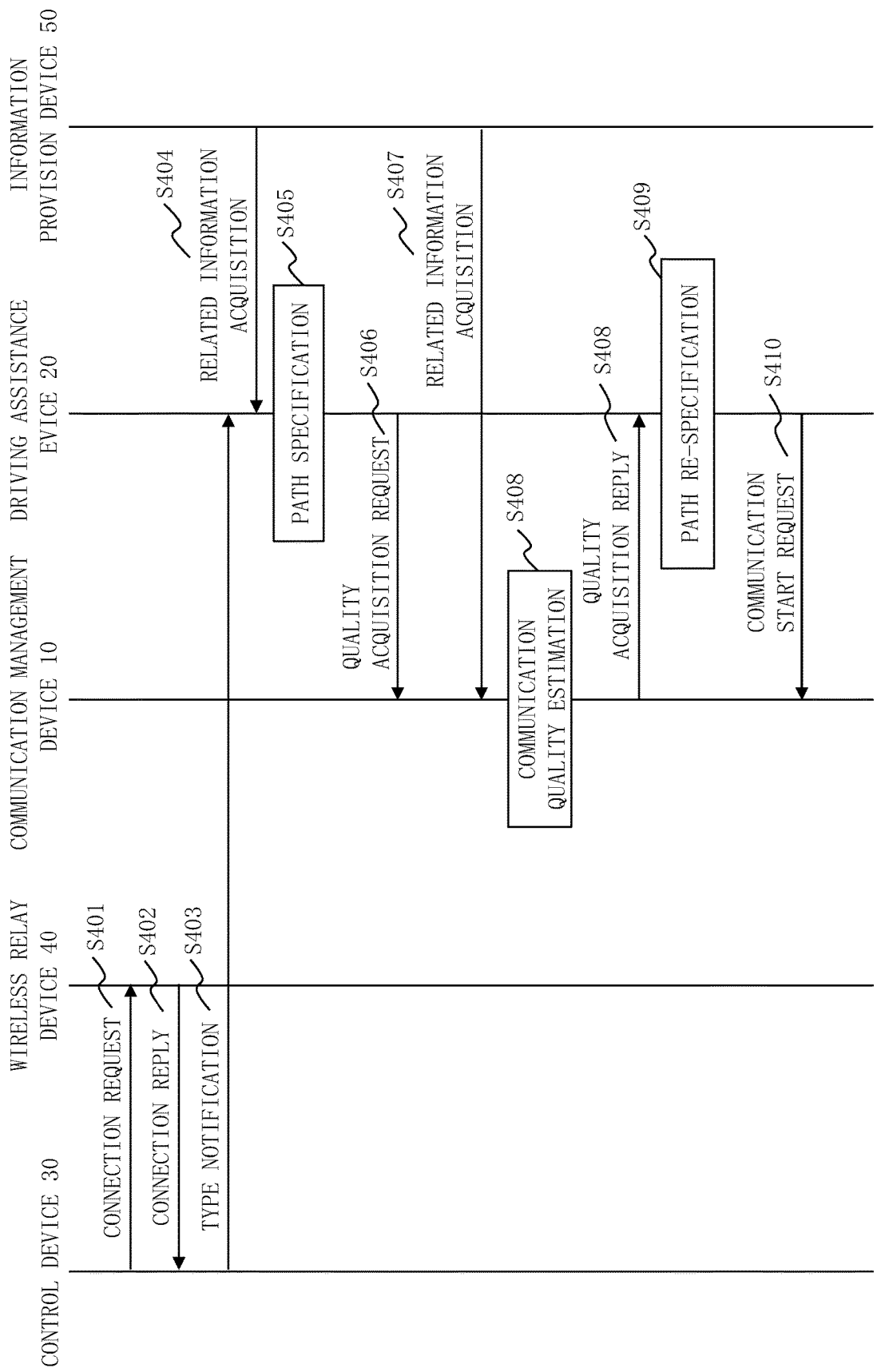
FIG. 11 is a processing flowchart of the driving assistance process according to a second variation.

With reference to FIG. 11, description will be made on a driving assistance process according to a second variation.

The processes from Step S401 through Step S405 are the same as the processes from Step S201 through Step S205 in FIG. 7.

(Step S406: Quality Request Process)

With respect to the communication area including the scheduled path specified in Step S405, the communication adjustment unit 214 of the driving assistance device 20 transmits a quality acquisition request to request communication quality at the scheduled time when the moving object 70 passes through the communication area, to the communication management device 10. The quality acquisition request indicates a communication area and a scheduled time.

(Step S407: Related Information Acquisition Process)

The information acquisition unit 111 of the communication management device 10 acquires, from the information provision device 50, related information with respect to the communication area indicated in the quality acquisition request, the related information being related to automatic driving such as weather information and road traffic information. The information acquisition unit 111 writes the related information in the storage unit 23.

(Step S408: Quality Estimation Process)

The quality estimation unit 114 of the communication management device 10 sets each communication area indicated in the quality acquisition request as a communication area being an object. Then, the quality estimation unit 114 estimates communication quality at a scheduled time between the driving assistance device 20 and the control device 30 with respect to each communication area, as with the process in Step S214 in FIG. 7.

The quality estimation unit 114 transmits a quality acquisition reply to the driving assistance device 20. The quality acquisition reply indicates communication quality estimated with respect to each communication area indicated in the quality acquisition request.

(Step S409: Path Re-Specification Process)

The communication adjustment unit 214 of the driving assistance device 20 specifies necessary communication quality based on a type of the driving assistance service included in a start request of the driving assistance service, as with Step S206 in FIG. 7.

The service determination unit 213 decides whether it is necessary to specify again a scheduled path by comparing the communication quality with respect to each communication area indicated in the quality acquisition reply with the necessary communication quality. When there is a communication area in which the communication quality is lower than the necessary communication quality for providing a standard driving assistance service, the service determination unit 213 determines that it is necessary to specify the scheduled path again. When it is decided that it is necessary to specify the scheduled path again, the service determination unit 213 specifies again, as a scheduled path, a path which does not pass through a communication area in which the communication quality is lower than the necessary communication quality for providing a standard driving assistance service.

(Step S410: Communication Start Request Process)

The communication adjustment unit 214 of the driving assistance device 20 transmits a communication start request to the communication management device 10 as with Step S207 in FIG. 7.

The processes from Step S406 through Step S409 may be repeatedly performed again until it is decided that it is unnecessary to specify the expected path again.

As described above, when there is a communication area in which the communication quality is lower than the necessary communication quality, the service determination unit 213 of the driving assistance device 20 specifies a scheduled path again. This makes it possible to reduce the possibility that the driving assistance service scheduled cannot be provided due to decline in communication quality.

<Third Variation>

In the first embodiment, communication quality for each control device 30 has been estimated. As a third variation, it may be possible to update the learning model 131 by using communication quality estimated for a control device 30, and communication quality measured by practically making communication by the control device 30.

Figure 12:
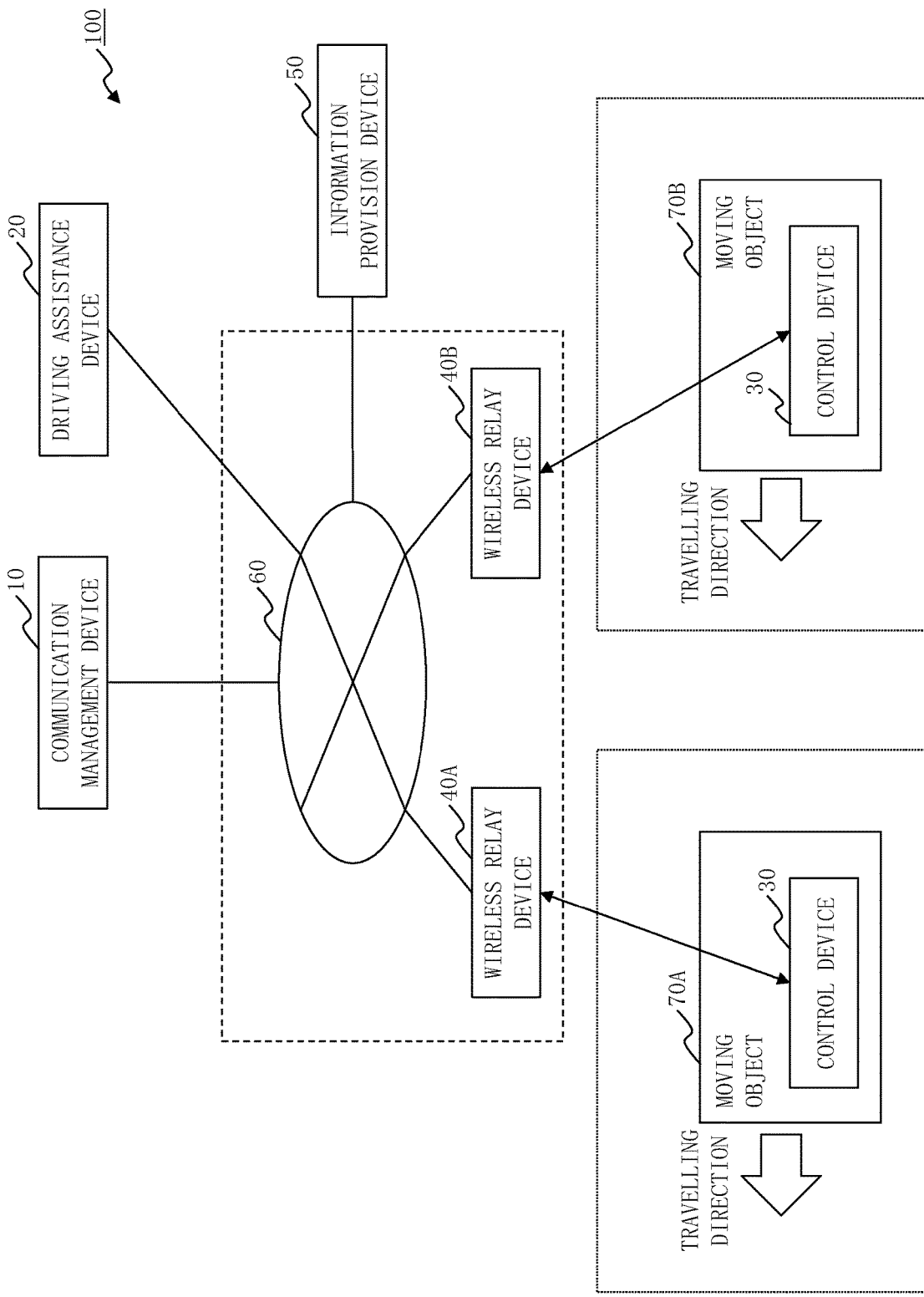
FIG. 12 is an explanatory diagram of a quality estimation process according to a third variation.

With reference to FIG. 12, description will be made on a quality estimation process according to the third embodiment.

In FIG. 12, the driving assistance device 20 provides a control device 30 mounted on a moving object 70A and a control device 30 mounted on a moving object 70B with a driving assistance service. The moving object 70A exists in a communication area of a wireless relay device 40A, and with respect to the control device 30 mounted on the moving object 70A, communication quality with the driving assistance device 20 regarding the wireless relay device 40A has been estimated in the past. Further, the moving object 70A is in the communication area of the wireless relay device 40A, and with respect to the control device 30 mounted on the moving object 70A, communication quality with the driving assistance device 20 regarding the wireless relay device 40A is practically measured.

Then, the communication learning unit 112 of the communication management device 10 makes the learning model 131 learn by using a result of comparison between the communication quality estimated and the communication quality measured, as an input. In this case, the communication learning unit 112 makes the learning model 131 learn using a reinforcement learning method, for example.

In FIG. 12, the moving object 70B is in the communication area of a wireless relay device 40B, and the communication area of the wireless relay device 40 A is included in the scheduled path. Therefore, by using a learning model made to learn by using a result of comparison between communication quality estimated and communication quality measured as an input, with respect to the control device 30 mounted on the moving object 70B, the quality estimation unit 114 of the communication management device 10 estimates communication quality with the driving assistance device 20 regarding the wireless relay device 40A.

As described above, the communication learning unit 112 of the communication management device 10 makes the learning model 131 learn by using communication quality estimated with respect to another control device 30, and communication quality measured by making communication practically by the other control device 30. In this manner, it is possible to enhance estimation accuracy of the communication quality.

<Fourth Variation>

In the first embodiment, each functional component is realized by software. However, as a fourth variation, each functional component may be realized by hardware. With respect to the fourth variation, description will be made on points different from those in the first embodiment.

When each functional component is realized by hardware, the communication management device 10 includes an electronic circuit instead of the processor 11, the memory and the storage unit 13. The electronic circuit is a dedicated circuit to realize functions of each functional component of the communication management device 10, the memory 12 and the storage unit 13.

Similarly, when each functional component is realized by hardware, the driving assistance device 20 includes an electronic circuit instead of the processor 21, the memory 22 and the storage unit 23. The electronic circuit is a dedicated circuit to realize functions of each functional component of the driving assistance device 20, the memory 22 and the storage unit 23.

Similarly, when each functional component is realized by hardware, the control device 30 includes an electronic circuit instead of the processor 31, the memory 32 and the storage unit 33. The electronic circuit is a dedicated circuit to realize functions of each functional component of the control device 30, the memory 32 and the storage unit 33.

Similarly, when each functional component is realized by hardware, the wireless relay device 40 includes an electronic circuit instead of the processor 41, the memory 42 and the storage unit 43. The electronic circuit is a dedicated circuit to realize functions of each functional component of the wireless relay device 40, the memory 42 and the storage unit 43.

As an electronic circuit, it is supposed a single circuit, a composite circuit, a processor made into a program, a processor made into a parallel program, a logic IC, a GA (gate array), an ASIC (application specification integrated circuit) or an FPGA (field-programmable gate array).

Each functional component may be realized by one electronic circuit, or may be realized by a plurality of electronic circuits dispersedly.

<Fifth Variation>

As a fifth variation, a part of each functional component may be realized by hardware, and the other part of each functional component may be realized by software.

The processor 11, the memory 12, the storage unit 13 and the electronic circuits are referred to as processing circuitry. That is, functions of each functional component are realized by the processing circuitry.

Second Embodiment

A second embodiment is different from the first embodiment in that when communication quality is estimated to be lower than a range of standard quality, it is notified to the control device 30 via a road-side unit 80 existing around the moving object 70. In the second embodiment, description will be made on this different point, and description on the same point will be omitted.

*Description of Configuration*

Figure 13:
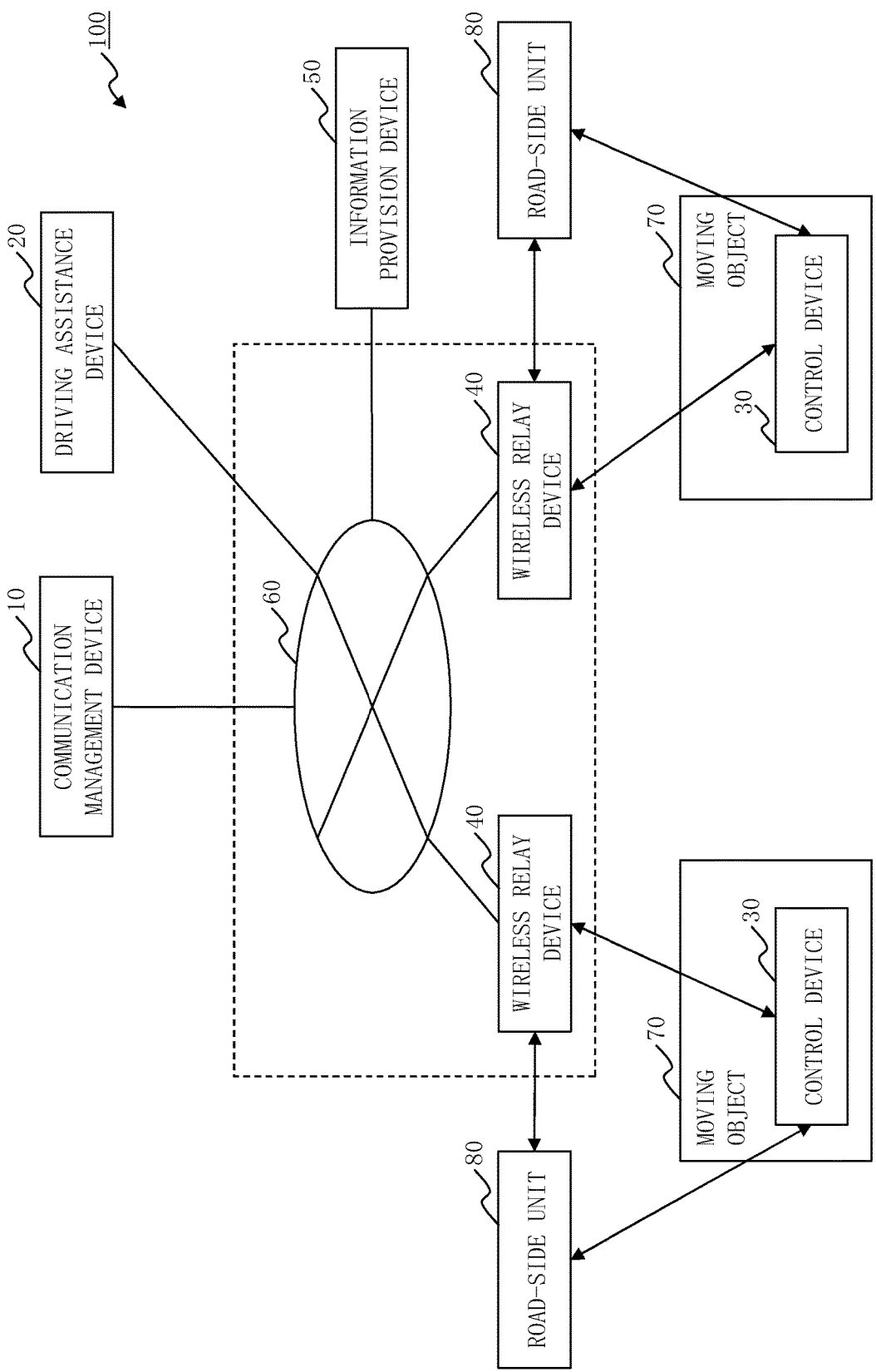
FIG. 13 is a configuration diagram of the driving assistance system 100 according to a second embodiment.

With reference to FIG. 13, description will be made on a configuration of a driving assistance system 100 according to the second embodiment.

The driving assistance system 100 is different from the driving assistance system 100 illustrated in FIG. 1 in that it includes a plurality of road-side units 80. Each road-side unit is connected to the communication network 60 via any wireless relay device 40.

Figure 14:
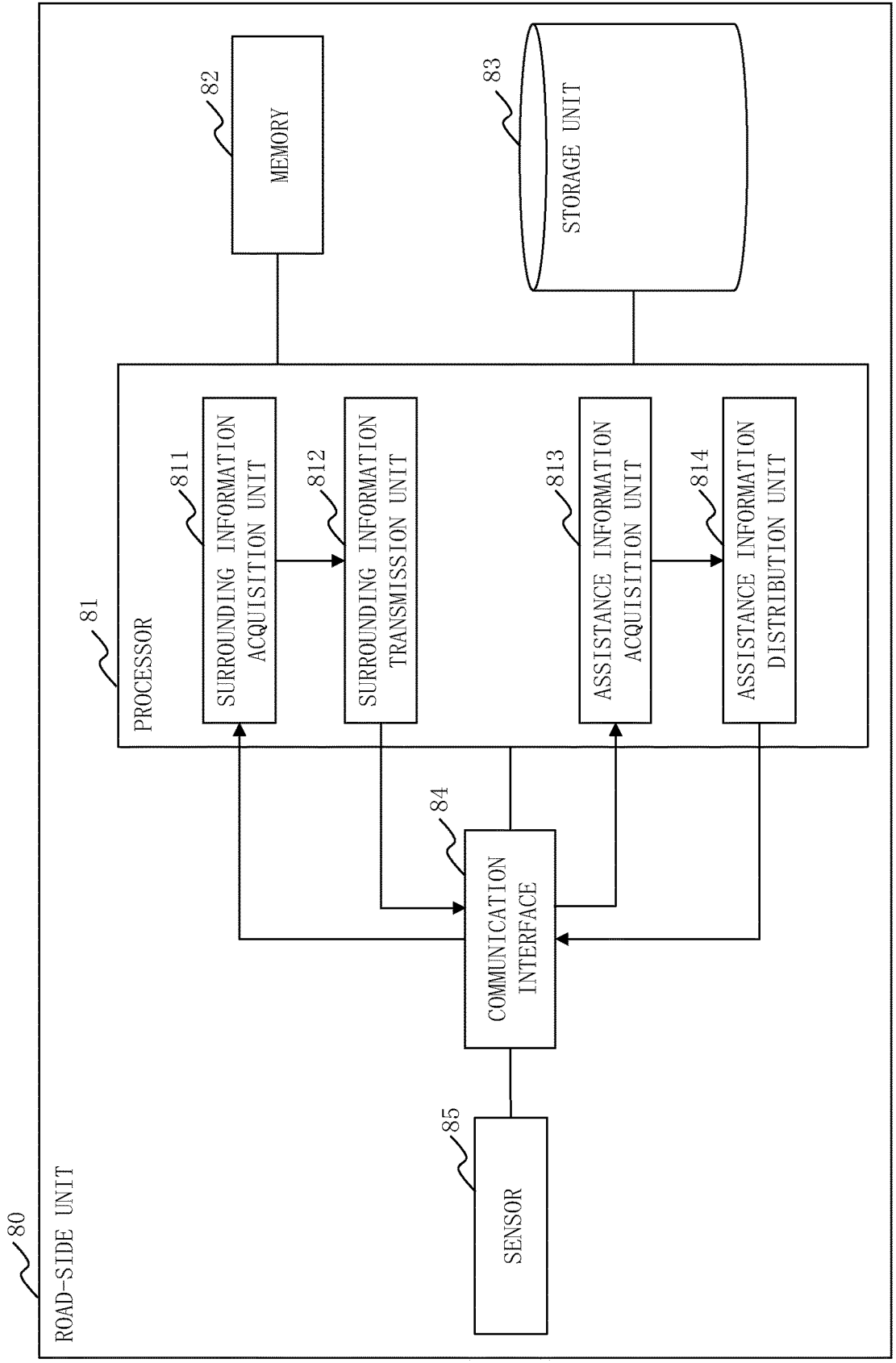
FIG. 14 is a configuration diagram of a road-side unit 80 according to the second embodiment.

With reference to FIG. 14, description will be made on a configuration of the road-side unit 80 according to the second embodiment.

The road-side unit 80 is a sensor system installed on a road side, and is a computer to provide the driving assistance device 20 and the control device 30 with information acquired.

The road-side unit 80 includes hardware components such as a processor 81, a memory 82, a storage unit 83 and a communication interface 84. The processor 81 is connected to other hardware components via a signal line, and controls these other hardware components. Further, the road-side unit 80 is connected to a sensor 85 such as a camera and a LiDAR via the communication interface 84.

The road-side unit 80 includes, as functional components, a surrounding information acquisition unit 811, a surrounding information transmission unit 812, an assistance information acquisition unit 813 and an assistance information distribution unit 814. Functions of each functional component of the road-side unit 80 are realized by software.

The storage unit 83 stores a program to realize the functions of each functional component of the road-side unit 80. This program is read into the memory 82 by the processor 81, and executed by the processor 81. In this manner, the functions of each functional component of the road-side unit 80 are realized.

*Description of Operation*

With reference to FIG. 15, description will be made on an operation of the driving assistance system 100 according to the second embodiment.

(Step S501: Data Communication Process)

Data communication is started between the driving assistance device 20 and the control device 30. The process until data transmission is started is as described in the driving assistance process indicated in FIG. 7.

When data communication is started, the surrounding information acquisition unit 811 of the road-side unit 80 collects information around the road-side unit 80 by the sensor 85. The surrounding information acquisition unit 811 analyzes the information collected, and specifies a type of a surrounding object. The type of object is a vehicle, a pedestrian, an animal, and an obstacle such as a falling object, etc. Further, the surrounding information acquisition unit 811 specifies a type of a vehicle. The type of the vehicle is a passenger car, a truck, and a motorbike, etc. Furthermore, the surrounding information acquisition unit 811 specifies a distance and a direction to the object. Then, the surrounding information transmission unit 812 transmits the information specified to the driving assistance device 20.

(Step S502: Quality Monitoring Process)

As with Step S102 in FIG. 6, each wireless relay device 40 and the driving assistance device 20 specify communication quality.

(Step S503: Quality Degradation Notification Process)

When the communication quality of the communication network 60 specified in Step S502 is lower than a lower limit of the range of the standard quality, the communication adjustment unit 113 of the communication management device 10 transmits a quality degradation notification to notify the control device 30 via the road-side unit 80. That is, when it is decided that communication between the control device 30 and the wireless relay device 40 becomes difficult due to degradation of communication quality, the communication adjustment unit 113 transmits the quality degradation notification to the control device 30 via the road-side unit 80.

The assistance information acquisition unit 813 of the road-side unit 80 receives the quality degradation notification. Then, the assistance information distribution unit 814 of the road-side unit 80 transmits the quality degradation notification to all the control devices 30 existing in the communication range.

(Step S504: Control Method Change Process)

The integrity control unit 313 of the control device 30 receives the quality degradation notification transmitted in Step S503. Then, the integrity control unit 313 decides that communication from the driving assistance device 20 ceases, or a delay in communication with the driving assistance device 20 increases, and changes the control method of the moving object 70.

As a specific example, when a remote operation service of remote-type automatic driving is provided, the integrity control unit 313 displays start of manual driving associated with suspension of the automatic driving function on a display device, etc. mounted on the moving object 70, and notifies the driver of the moving object 70 of switching to manual driving. After that, the integrity control unit 313 stops control over apparatuses such as an accelerator, a break and a steering, and switches to control to notify the driver of surrounding information.

Effect of Second Embodiment

As described above, in the driving assistance system 100 according to the second embodiment, when communication quality is actually degraded, it is notified to each control device 30 via the road-side unit 80. Then, each control device 30 switches the control method of the moving object 70 upon receipt of the notification. In this manner, it is possible to realize suitable control in accordance with communication quality.

"Unit" in the description above may be replaced with "circuit", "step", "procedure". "process" or "processing circuit".

The above describes the embodiments and the variations of the present invention. It is also applicable to combine and perform some of these embodiments and variations. Further, it may be applicable to partially perform one or some. The present invention is not limited to the embodiments and the variations described above, for which various alterations are possible as needed.

REFERENCE SIGNS LIST

100: driving assistance system; 10: communication management device; 11: processor; 12: memory; 13: storage unit; 14: communication interface; 111: information acquisition unit; 112: communication learning unit; 113: communication adjustment unit; 114: quality estimation unit; 115: notification unit; 131: learning model; 132: area information; 20: driving assistance device; 21: processor; 22: memory; 23: storage unit; 24: communication interface; 211: information acquisition unit; 212: communication monitoring unit; 213: service determination unit; 214: communication adjustment unit; 215: service provision unit; 231: quality information; 232: area information; 30: control device; 31: processor; 32: memory; 33: storage unit; 34: communication interface; 311: information acquisition unit; 312: input reception unit; 313: integrity control unit; 40: wireless relay device; 41: processor; 42: memory; 43: storage unit; 44: communication interface; 411: communication monitoring unit; 412: communication adjustment unit; 50: information provision device; 60: communication network; 70: moving object; 80: road-side unit; 81: processor; 82: memory; 83: storage unit; 84: communication interface; 85: sensor; 811: information acquisition unit; 812: information transmission unit; 813: assistance information acquisition unit; 814: assistance information distribution unit

The invention claimed is:

1. A communication management device comprising:
processing circuitry to:
estimate a communication quality between a control device that is mounted on a moving object and a driving assistance device to provide a driving assistance service for the control device, at a scheduled time when the moving object passes through a communication monitoring area, which includes a scheduled path where the moving object passes,
notify the driving assistance device when the estimated communication quality is outside a range of a standard quality, and estimate the communication quality prior to the scheduled time by a time equal to or more than a change time necessary for changing the driving assistance service provided by the driving assistance device.

2. The communication management device according to claim 1,
wherein the processing circuitry estimates the communication quality in consideration of a quality statistic that indicates a quality of communication in the past and a control condition in the past with respect to the communication monitoring area, and of a scheduled condition that indicates the control condition at the scheduled time with respect to the communication monitoring area.

3. The communication management device according to claim 2,
wherein the processing circuitry estimates the communication quality by using a learning model that is generated by using the quality statistic as an input, the learning model outputting an estimated value of the quality of communication by using the control condition as an input.

4. The communication management device according to claim 3,
wherein the processing circuitry makes the learning model learn by the estimated communication quality, and by a quality of communication that is measured when the moving object passes through the communication monitoring area.

5. The communication management device according to claim 1,
wherein the moving object is a vehicle, and
wherein the processing circuitry notifies the control device when the communication quality is lower than a lower limit of the range of the standard quality, via a road-side unit that exists around the moving object.

6. A communication management method comprising:
estimating a communication quality between a control device that is mounted on a moving object and a driving assistance device to provide a driving assistance service for the control device, at a scheduled time when the moving object passes through a communication monitoring area, which includes a scheduled path where the moving object passes,
notifying when the communication quality estimated is outside a range of a standard quality, and
estimating the communication quality prior to the scheduled time by a time equal to or more than a change time necessary for changing the driving assistance service provided by the driving assistance device.

7. A non-transitory computer readable medium storing a communication management program to make a computer function as a communication management device to perform:
a quality estimation process to estimate a communication quality between a control device that is mounted on a moving object and a driving assistance device to provide a driving assistance service for the control device, at a scheduled time when the moving object passes through a communication monitoring area, which includes a scheduled path where the moving object passes, and
a notification process to notify when the communication quality estimated by the quality estimation process is outside a range of a standard quality, wherein
in the quality estimation process, the communication quality is estimated prior to the scheduled time by a time equal to or more than a change time necessary for changing the driving assistance service provided by the driving assistance device.

8. A driving assistance device to provide a driving assistance service for a control device that is mounted on a moving object, the driving assistance device comprising:
processing circuitry to: determine a type of the driving assistance service provided for the control device, based on a communication quality with the control device at a scheduled time when the moving object passes through a communication monitoring area, which includes a scheduled path where the moving object passes, and
provide the control device with the determined driving assistance service of the type.

9. The driving assistance device according to claim 8,
wherein the processing circuitry acquires quality information that indicates the communication quality, and
determines the type of the driving assistance service again based on the communication quality indicated in the quality information when the acquired quality information.

10. The driving assistance device according to claim 8, wherein
the processing circuitry provides the driving assistance service to a plurality of control devices, and
the processing circuitry adjusts a communication resource that is allocated to communication with each of the plurality of control devices based on the communication quality, the communication resource being used to provide the driving assistance service for each of the plurality of control devices.

11. The driving assistance device according to claim 10,
wherein the processing circuitry reduces a communication resource allocated to communication with a control device that is provided with a driving assistance service of low priority among the plurality of control devices, and increases a communication resource allocated to communication with a control device with which the communication quality is lower than a lower limit of a range of a standard quality.

12. The driving assistance device according to claim 8,
wherein the processing circuitry changes the scheduled path in accordance with the communication quality.

13. A driving assistance method to provide a driving assistance service for a control device that is mounted on a moving object, the driving assistance method comprising:
determining a type of the driving assistance service that is provided for the control device, based on a communication quality between the control device and a driving assistance device at a scheduled time when the moving object passes through a communication monitoring area, which includes a scheduled path where the moving object passes, and
providing the control device with the driving assistance service of the type determined.

14. A non-transitory computer readable medium storing a driving assistance program to make a computer function as a driving assistance device, providing a driving assistance service for a control device that is mounted on a moving object, the driving assistance program performing:
a service determination process to determine a type of the driving assistance service that is provided for the control device, based on a communication quality between the control device and a driving assistance device at a scheduled time when the moving object passes through a communication monitoring area, which includes a scheduled path where the moving object passes, and a service provision process to provide the control device with the driving assistance service of the type determined by the service determination process.

\* \* \* \* \*